US012614225B2

(12) United States Patent (10) Patent No.: US 12,614,225 B2

Miyagi (45) Date of Patent: Apr. 28, 2026

(54) TRACKING-BASED POINT-OF-SALE SYSTEM

(71) Applicant: Toshiba Tec Kabushiki Kaisha, Tokyo (JP)

(72) Inventor: Daisuke Miyagi, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 76 days.

(21) Appl. No.: 18/361,173

(22) Filed: Jul. 28, 2023

(65) Prior Publication Data

US 2023/0368277 A1 Nov. 16, 2023

Related U.S. Application Data

(63) Continuation of application No. 17/108,279, filed on Dec. 1, 2020, now Pat. No. 11,763,374.

(30) Foreign Application Priority Data

Feb. 3, 2020 (JP) ................................. 2020-016313

(51) Int. Cl.
G06Q 30/0601 (2023.01)

(52) U.S. Cl.
CPC ..... G06Q 30/0639 (2013.01); G06Q 30/0623 (2013.01); G06Q 30/0633 (2013.01)

(58) Field of Classification Search
CPC ... G06Q 30/0601–0645; G06Q 10/087; G06Q 20/202; G06Q 20/208;

(Continued)

(56) References Cited

U.S. PATENT DOCUMENTS 10,466,092 B1 11/2019 Shiee et al.
10,943,285 B1 * 3/2021 Grigsby ................. H04W 4/35
(Continued)

FOREIGN PATENT DOCUMENTS

CN 107705129 A 2/2018
CN 107862775 A 3/2018
(Continued)

OTHER PUBLICATIONS

Schuman, E. (2005). A smarter smart cart? EWeek, , NA. Retrieved from https://dialog.proquest.com/professional/docview/1093717249? accountid=131444 (Year: 2005).*

(Continued)

*Primary Examiner* — Ashley D Preston

(74) *Attorney, Agent, or Firm* — Kim & Stewart LLP

(57) ABSTRACT

A tracking-based point-of-sales (POS) system includes a first sensing device, a second sensing device, and a processing device. The processing device is configured to perform location tracking with respect to the one or more customers around the product display section based on location information, perform a first operation to determine a purchasing customer who has performed a product displacement activity based on a result of the location tracking, and perform a product registration. The processing device is configured to perform a second operation to determine a product-returning customer who has performed a product placement activity based on a result of the location tracking, and perform a product deregistration. The processing device is configured to, upon the product deregistration causing an anomalous number of product in a purchase list of the product-returning customer, perform an anomaly operation.

20 Claims, 19 Drawing Sheets

(58) Field of Classification Search
CPC .. G06Q 30/0201; G06Q 30/06; G06Q 20/201;
G06Q 30/06331; G06Q 30/08; G07G
1/0036
USPC ............................................... 705/26.1–27.2
See application file for complete search history.

(56) References Cited

U.S. PATENT DOCUMENTS

| | | | | | |
|---|---|---|---|---|---|
| 11,763,374 | B2 * | 9/2023 | Miyagi | ................ | G07G 1/0036 |
| | | | | | 705/26.9 |
| 2007/0233579 | A1 * | 10/2007 | Saarinen | ............ | G06Q 30/0633 |
| | | | | | 705/26.8 |
| 2015/0029339 | A1 | 1/2015 | Kobres et al. | | |
| 2016/0019514 | A1 | 1/2016 | Landers, Jr. et al. | | |
| 2019/0057435 | A1 * | 2/2019 | Chomley | .................. | B62B 3/14 |
| 2020/0082373 | A1 * | 3/2020 | Kozak | .................. | G07G 1/0081 |
| 2020/0364752 | A1 | 11/2020 | Okamoto et al. | | |

FOREIGN PATENT DOCUMENTS

| | | |
|---|---|---|
| EP | 2975568 A1 | 1/2016 |
| JP | H08-190672 A | 7/1996 |
| JP | H10162244 A | 6/1998 |
| JP | 2000-123086 A | 4/2000 |
| JP | 2007-241430 A | 9/2007 |
| WO | 2019/038968 A1 | 2/2019 |

OTHER PUBLICATIONS

Extended European Search Report dated Jun. 9, 2021, mailed in counterpart European Patent Application No. 21152554.8, 8 pages.
Porter, Jon, "This Smart Shopping Cart is a Self-Service Checkout on Wheels", Jan. 10, 2019 published via The Verge, accessed via https://www.theverge.com/2019/1/10/18177020/caper-labs-smart-shopping-cart-image-recognition-weight-sensor (Year: 2019), 2 pages.
Notice of Reasons for Refusal (Office Action) mailed Sep. 10, 2024 in Japanese Patent Application No. 2021-014907 with English machine translation, 6 pages.
First Office Action mailed Sep. 26, 2023 in Chinese Patent Application No. 202110008439.9 with English translation, 15 pages.
Notice of Reasons for Refusal (Office Action) mailed Mar. 3, 2026 in corresponding Japanese Patent Application No. 2025-035718, with English machine translation, 8 pages.

\* cited by examiner

61

| COMMODITY CODE | COMMODITY NAME | UNIT WEIGHT | SENSOR NUMBER |
|---|---|---|---|
| 11111111 | COMMODITY A | 500g | 1000001 |
| 22222222 | COMMODITY B | 500g | 1000002 |
| 33333333 | COMMODITY C | 600g | 1000003 |
| 44444444 | COMMODITY D | 650g | 1000004 |
| 55555555 | COMMODITY E | 800g | 1000005 |
| 66666666 | COMMODITY F | 300g | 1000006 |

| MEMBER ID | TRACKING ID |
|---|---|
|  |  |
|  |  |
|  |  |
| ⋮ | ⋮ |

| MEMBER ID | | | | | | |
|---|---|---|---|---|---|---|
| COMMODITY CODE | COMMODITY NAME | UNIT PRICE | NUMBER | AMOUNT OF MONEY | TEMPORARY REGISTRATION | ANOTHER MEMBER ID |
|  |  |  |  |  |  |  |

Figure 8:
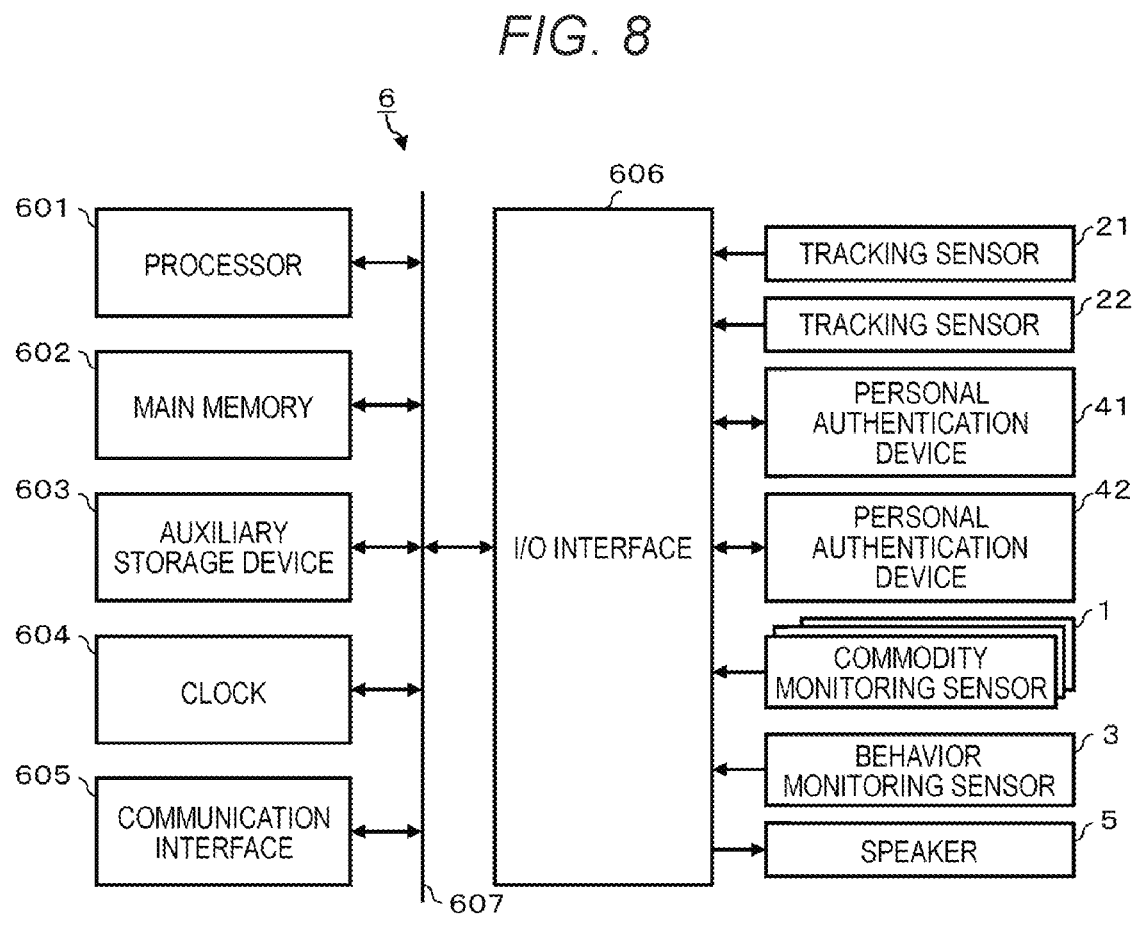

601 — PROCESSOR

602 — MAIN MEMORY

603 — AUXILIARY STORAGE DEVICE

604 — CLOCK

605 — COMMUNICATION INTERFACE

607

606 — I/O INTERFACE

TRACKING SENSOR — 21

TRACKING SENSOR — 22

PERSONAL AUTHENTICATION DEVICE — 41

PERSONAL AUTHENTICATION DEVICE — 42

COMMODITY MONITORING SENSOR — 1

BEHAVIOR MONITORING SENSOR — 3

SPEAKER — 5

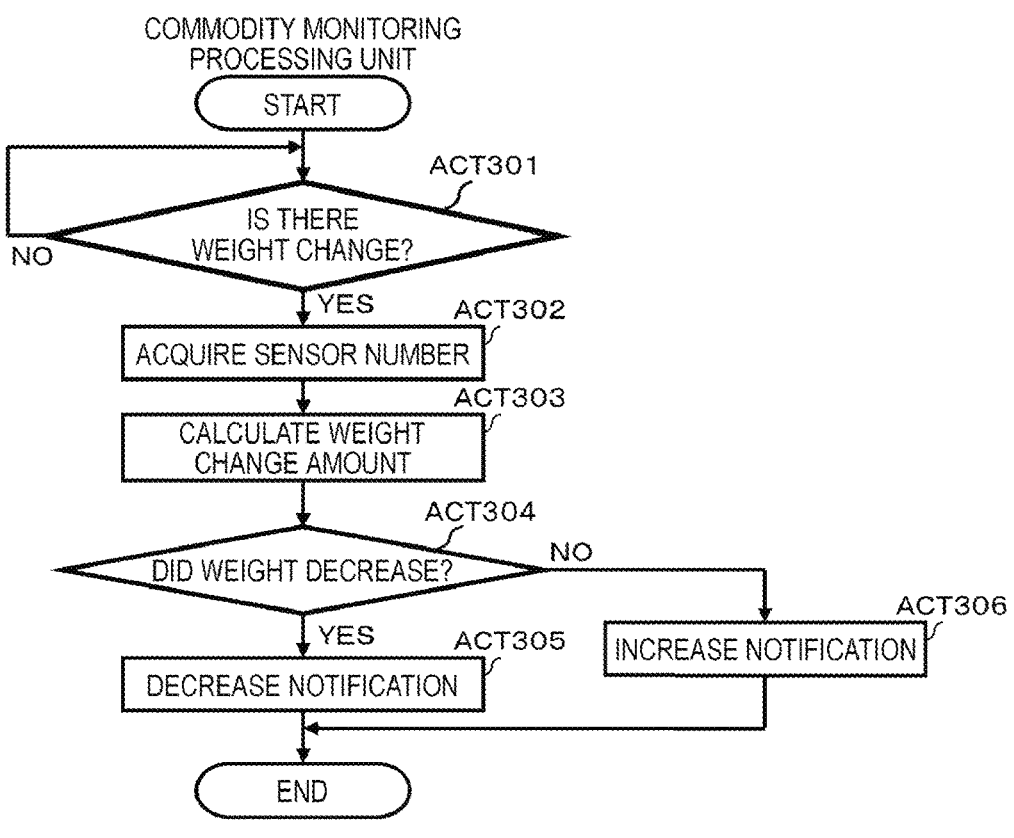

COMMODITY MONITORING
PROCESSING UNIT

START

ACT301
IS THERE
WEIGHT CHANGE?
NO
YES

ACT302
ACQUIRE SENSOR NUMBER

ACT303
CALCULATE WEIGHT
CHANGE AMOUNT

ACT304
DID WEIGHT DECREASE?
NO
YES

ACT306
INCREASE NOTIFICATION

ACT305
DECREASE NOTIFICATION

END

FIG. 12

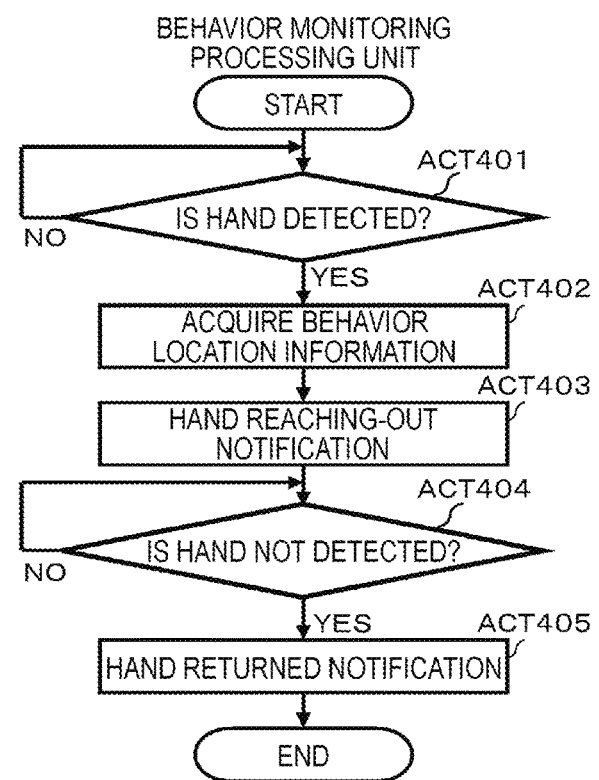

BEHAVIOR MONITORING
PROCESSING UNIT

START

ACT401
IS HAND DETECTED?
NO
YES

ACT402
ACQUIRE BEHAVIOR
LOCATION INFORMATION

ACT403
HAND REACHING-OUT
NOTIFICATION

ACT404
IS HAND NOT DETECTED?
NO
YES

ACT405
HAND RETURNED NOTIFICATION

END

*FIG. 19*

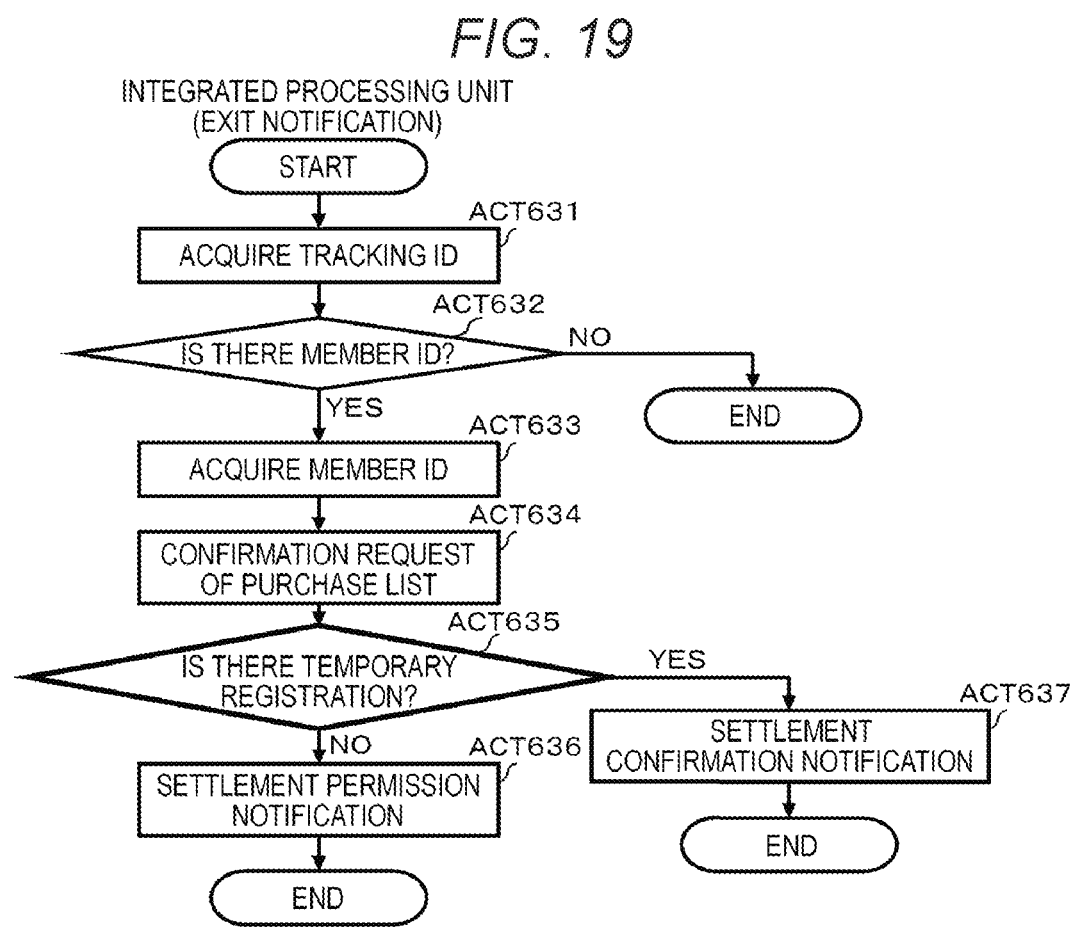

INTEGRATED PROCESSING UNIT
(EXIT NOTIFICATION)

START

ACT631
ACQUIRE TRACKING ID

ACT632
IS THERE MEMBER ID? — NO → END

YES

ACT633
ACQUIRE MEMBER ID

ACT634
CONFIRMATION REQUEST
OF PURCHASE LIST

ACT635
IS THERE TEMPORARY
REGISTRATION? — YES →

ACT637
SETTLEMENT
CONFIRMATION NOTIFICATION

END

NO

ACT636
SETTLEMENT PERMISSION
NOTIFICATION

END

FIG. 20

SALES MANAGEMENT APPARATUS
(PURCHASE NOTIFICATION)

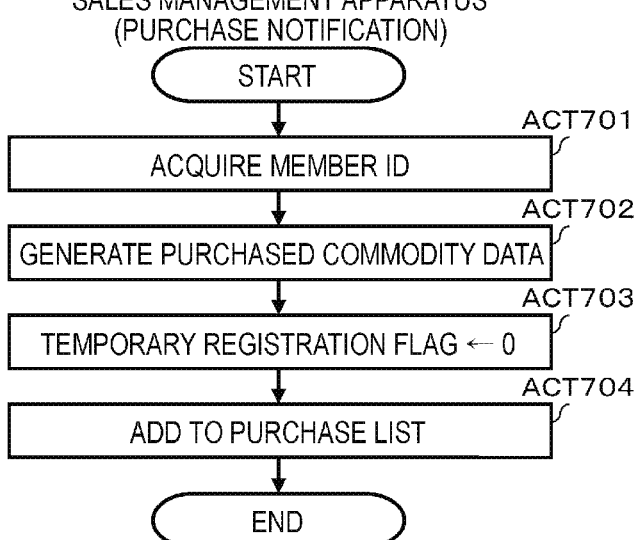

START

ACT701
ACQUIRE MEMBER ID

ACT702
GENERATE PURCHASED COMMODITY DATA

ACT703
TEMPORARY REGISTRATION FLAG ← 0

ACT704
ADD TO PURCHASE LIST

END

FIG. 21

SALES MANAGEMENT APPARATUS
(RETURN NOTIFICATION)

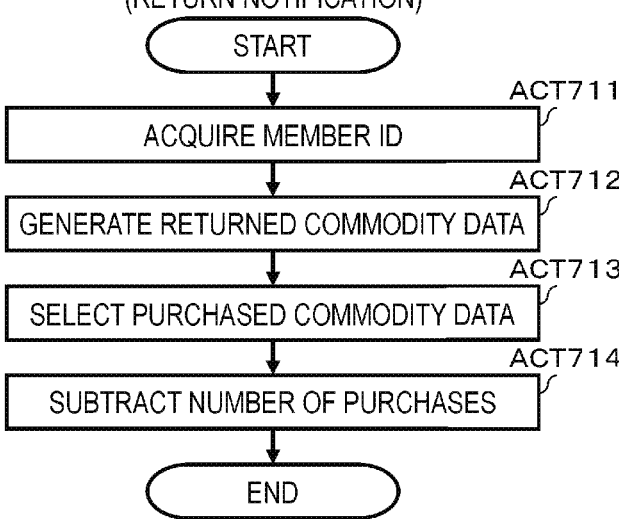

START

ACT711
ACQUIRE MEMBER ID

ACT712
GENERATE RETURNED COMMODITY DATA

ACT713
SELECT PURCHASED COMMODITY DATA

ACT714
SUBTRACT NUMBER OF PURCHASES

END

SALES MANAGEMENT APPARATUS
(SETTLEMENT PERMISSION NOTIFICATION)

SALES MANAGEMENT APPARATUS
(SETTLEMENT CONFIRMATION NOTIFICATION)

TRACKING-BASED POINT-OF-SALE SYSTEM

CROSS-REFERENCE TO RELATED APPLICATION

This application is a continuation of U.S. patent application Ser. No. 17/108,279, filed on Dec. 1, 2020, which is based upon and claims the benefit of priority from Japanese Patent Application No. 2020-016313, filed on Feb. 3, 2020, the entire contents of which are incorporated herein by reference.

FIELD

Embodiments described herein relate generally to a tracking-based point-of-sale apparatus, tracking-based point-of-sale, tracking-based point-of-sale method.

BACKGROUND

There are various store systems that do not require commodity registration to be performed at the same time as payment processing. Some such store systems automatically register items being purchased by a consumer based upon behavior of the consumer in the store. One of these store systems identifies a consumer near a display shelf who appears to take an item from the display shelf as a purchaser of the item. By introducing such a type of store system to a convenience store or other a small-scale store, it is possible to implement an unmanned store.

With such a store system, when a commodity is returned to a shelf, the consumer near the shelf who appears to return the commodity is treated as a person returning the commodity. However, when multiple consumers are near a display shelf and each remove or return items to the shelf at almost the same time, there is a possibility of making an error in identifying which person is actually the person returning an item commodity and which is a purchaser. When such an error occurs, there can be inconsistency between the items actually intended to be purchased by a consumer and the items that are registered as a purchased items for the consumer. It is desirable that such inconsistency be eliminated before settlement processing.

BRIEF DESCRIPTION OF THE DRAWINGS

FIG. 6 is a schematic diagram illustrating an example of a data structure of a correlation table.

FIG. 7 is a schematic diagram illustrating an example of a data structure of a purchase list.

FIG. 8 is a block diagram of a shelf control apparatus.

FIG. 9 is a flowchart illustrating an operation procedure of a tracking processing unit.

FIG. 11 is a flowchart illustrating an operation procedure of a commodity monitoring processing unit.

FIG. 12 is a flowchart illustrating an operation procedure of a behavior monitoring processing unit.

FIG. 19 is a flowchart illustrating an operation procedure of the integrated processing unit to which an exit notification command is inputted.

FIG. 20 is a flowchart illustrating an operation procedure of a sales management apparatus to which a purchase notification command is inputted.

FIG. 21 is a flowchart illustrating an operation procedure of the sales management apparatus to which a return notification command is inputted.

DETAILED DESCRIPTION

An embodiment is directed to providing a point-of-sales system capable of eliminating before settlement processing an inconsistency between items intended to be purchased by a consumer and the items registered as items being purchased by the consumer.

In general, according to an embodiment, a tracking-based point-of-sales (POS) system includes a first sensing device, a second sensing device, and a processing device. The first sensing device is configured to obtain location information of one or more customers around a product display section associated with a product identified with a product ID. The second sensing device is configured to detect a product displacement activity and a product placement activity at the product display section. The processing device is configured to perform location tracking with respect to the one or more customers around the product display section based on the obtained location information, upon the second sensing device detecting the product displacement activity, perform a first operation to determine a purchasing customer who has performed the product displacement activity based on a result of the location tracking, and perform a product registration to register the product of a first number to a purchase list of the purchasing customer, upon the second sensing device detecting the product placement activity, perform a second operation to determine a product-returning customer who has performed the product placement activity based on a result of the location tracking, and perform a product deregistration to deregister the product of a second number from a purchase list of the product-returning customer, and upon the product deregistration causing the number of the product on the purchase list of the product-returning customer to be less than zero, perform an anomaly operation.

Hereinafter, an example embodiment of a point-of-sales system will be described with reference to the drawings.

The example embodiment describes a point-of-sales system in a store system 100 (refer to FIG. 3) in which a commodity purchased by a consumer is configured to be automatically registered by using a technology in which when a commodity is taken from a shelf 10 (refer to FIGS. 1 and 2), a consumer who performs a behavior of taking the commodity near the shelf 10 is specified as a purchaser of the commodity.

First, the shelf 10 used in the store system 100 will be described with reference to FIGS. 1 and 2.

Figures 1, 2:
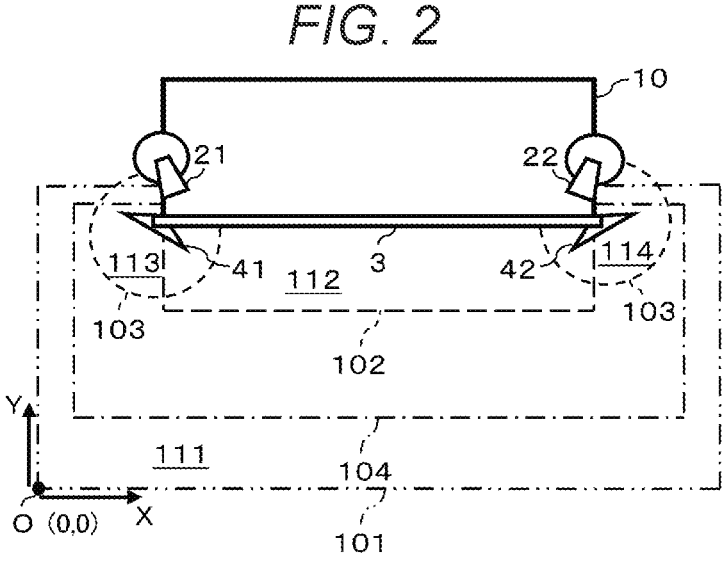
FIG. 1 is a schematic front view of a shelf used in a store system according to an embodiment.
FIG. 2 is a schematic overhead view of the shelf.

FIG. 1 is a schematic view of the shelf 10 when viewed from the front, and FIG. 2 is a schematic view of the shelf 10 when viewed from above. As illustrated in FIG. 1, the shelf 10 is a three-stage shelf partitioned by two shelf plates in a vertical direction. In each stage, two kinds of commodities are divided and displayed in each section. As an example, a commodity A and a commodity B are displayed side by side in an upper stage, a commodity C and a commodity D are displayed side by side in a middle stage, and a commodity E and a commodity F are displayed side by side in a lower stage. The shelf 10 is an example of a commodity display section or a product display section.

Hereinafter, a section on a left side of the upper stage where the commodity A is displayed is referred to as a section 201, a section on a right side of the upper stage where the commodity B is displayed is referred to as a section 202, a section on a left side of the middle stage where the commodity C is displayed is referred to as a section 203, a section on a right side of the middle stage where the commodity D is displayed is referred to as a section 204, a section on a left side of the lower stage where the commodity E is displayed is referred to as a section 205, and a section on a right side of the lower stage where the commodity F is displayed is referred to as a section 206.

A commodity monitoring sensor 1 is mounted on each of the sections 201 to 206 on each stage. The commodity monitoring sensor 1 is a sensor for monitoring an increase or a decrease in a weight caused by movement of the commodity. In the embodiment, a weight sensor capable of measuring a total weight of the commodities displayed in the corresponding sections 201 to 206 is used as the commodity monitoring sensor 1.

As illustrated in FIGS. 1 and 2, two tracking sensors 21 and 22 and one behavior monitoring sensor 3 are mounted on an upper portion of the shelf 10. The tracking sensors 21 and 22 are separately mounted on the left side and the right side of the shelf 10. The behavior monitoring sensor 3 is mounted approximately parallel to a floor surface along a width direction of the shelf 10 on the front side of the shelf 10.

The tracking sensors 21 and 22 are sensors for tracking a movement of a consumer staying in a rectangular area 111 surrounded by a first boundary line virtually drawn by an alternate long and two short dashes line in FIG. 2. Hereinafter, the area 111 is referred to as a tracking area 111. In the embodiment, camera sensors such as an RGB camera, an IR camera, and an infrared camera capable of photographing the inside of the tracking area 111 are used as the tracking sensors 21 and 22. The number of tracking sensors 21 and 22 is not limited to two.

The behavior monitoring sensor 3 is a sensor for monitoring a behavior of a consumer with respect to the shelf 10 who stays in a rectangular area 112 surrounded by a second boundary line 102 virtually drawn by a broken line in FIG. 2. Specifically, the behavior monitoring sensor 3 monitors a behavior of the consumer staying in the area 112 and reaching out the hand to the shelf 10 and a behavior of the customer withdrawing the hand. Hereinafter, a behavior of reaching out the hand is referred to as a hand reaching-out behavior, and a behavior of withdrawing the hand is referred to as a hand returning behavior. The area 112 is an area estimated for a consumer to be located when the consumer takes out the commodities A to F from the shelf 10. Hereinafter, the area 112 will be referred to as a purchase area 112. The purchase area 112 is located inside the tracking area 111. In the embodiment, a time of flight (TOF) sensor, and a laser radar are used as the behavior monitoring sensor 3. The number of the behavior monitoring sensors 3 is not limited to one.

As illustrated in FIGS. 1 and 2, personal authentication devices 41 and 42 are mounted on opposite sides of the shelf 10. The personal authentication devices 41 and 42 are devices for personally authenticating a consumer. A consumer who uses a store performs member registration in advance. The member registration can be performed by installing a dedicated application program in a user terminal TM (refer to FIG. 3) such as a smartphone and a tablet terminal. By performing the member registration, a unique member ID of the consumer is set in the user terminal TM. Hereinafter, the application program is referred to as a shopping application. When the shopping application starts in the user terminal TM in which the member ID is set, a code representing the member ID is displayed on a display of the user terminal TM. The code is represented by, for example, a bar code system or a two-dimensional code system. The personal authentication devices 41 and 42 includes a reader for reading the code. The number of personal authentication devices 41 and 42 is not limited to two. Installation locations of the personal authentication devices 41 and 42 are not also limited to the opposite sides of the shelf 10.

In FIG. 2, circular areas 113 and 114 surrounded by a third boundary line 103 virtually drawn by a broken line are areas assumed to be accessed by the consumer so that the readers of the personal authentication devices 41 and 42 can read the code of the member ID displayed on the display of the user terminal TM. Hereinafter, the areas 113 and 114 are referred to as authentication areas 113 and 114. The authentication areas 113 and 114 are located inside the tracking area 111.

A fourth boundary line 104 is set between the first boundary line 101 and the second boundary line 102. In FIG. 2, the fourth boundary line 104 is virtually drawn by an alternate long and short dash line. The store system 100 starts tracking when a consumer enters the tracking area 111. When the consumer enters the inside of the fourth boundary line 104 from the outside thereof, the store system 100 sets a tracking ID for the consumer. When the consumer moves from the inside of the fourth boundary line 104 to the outer side thereof and further moves out of the first boundary line 101, the store system 100 ends the tracking of the consumer.

The first to fourth boundary lines 101 to 104 may not be linear but may be a band shape with a predetermined width. The tracking area 111 and the purchase area 112 may be areas having a shape other than a rectangle. The authentication areas 113 and 114 may be areas having a shape other than a circle.

The shelf 10 is an example of a commodity display place. The number of stages of shelves 10 and the number of commodities displayed on the respective stages are freely selected. In other words, it may be sufficient that a plurality of sections in which the commodities are displayed according to a type of commodity are provided, and the commodity monitoring sensors 1 are individually provided in the sections. Therefore, the commodity display place is not limited to the shelf, but may be a display stand, a display case, and a display space.

The tracking sensors 21 and 22, the behavior monitoring sensor 3, and the personal authentication devices 41 and 42 are not necessarily required to be provided on the shelf 10. For example, the tracking sensors 21 and 22 or the behavior monitoring sensor 3 may be provided on a ceiling of a store. The tracking sensors 21 and 22 may be provided at a place where the movement of the consumer staying in the tracking area 111 can be tracked. The behavior monitoring sensor 3 may be provided at a place where the behavior of the consumer staying in the purchase area 112 with respect to the shelf 10 can be monitored. For example, the personal authentication devices 41 and 42 may be provided near an entrance of the store.

Next, a configuration of the store system 100 will be described with reference to FIGS. 3 to 8.

Figure 3:
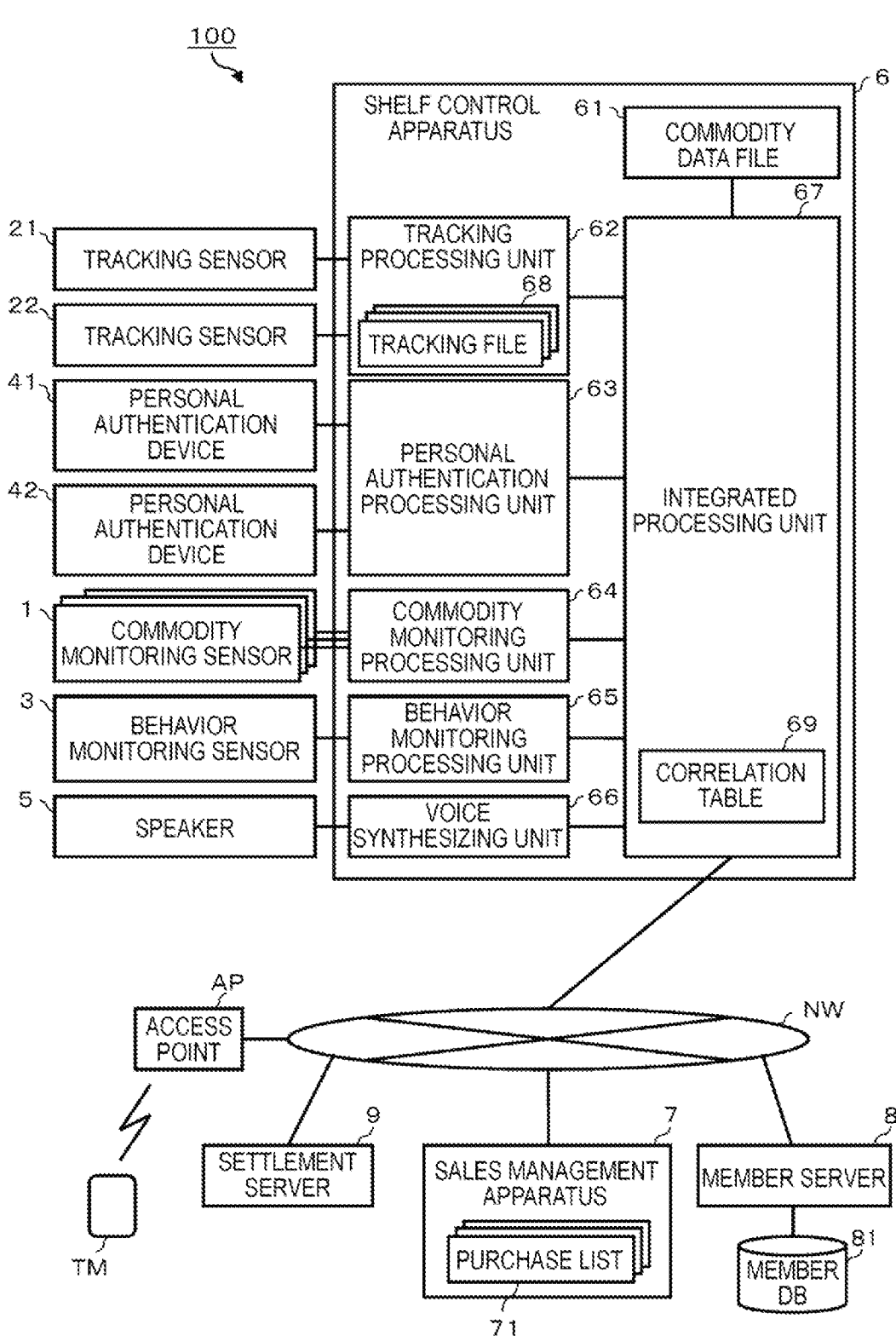
FIG. 3 is a block diagram illustrating a schematic configuration of a store system.

FIG. 3 is a block diagram illustrating a main part of the store system 100. The store system 100 includes a shelf control apparatus 6, a sales management apparatus 7, a member server 8, and a settlement server 9. The store system 100 allows the shelf control apparatus 6, the sales management apparatus 7, the member server 8, and the settlement server 9 to be connected to each other by a communication network NW such as a local area network (LAN). The store system 100 can perform wireless communication with the user terminal TM carried by a consumer who visits a store via an access point AP of the communication network NW.

The member server 8 manages a member database 81 for storing information related to the consumer who performs the member registration. The member database 81 stores a name of the consumer, terminal information of the user terminal TM carried by the consumer, information related to settlement registered by the consumer, and a valid flag in correlation with the member ID of each consumer. The terminal information includes information such as a communication address necessary for communicating with the user terminal TM via the communication network NW. The information related to the settlement includes information necessary for card settlement using a credit card and an electronic money card, or electronic settlement using a barcode and a two-dimensional code. The valid flag is 1-bit data for indicating whether the member ID is valid. In the embodiment, the valid flag of a valid member ID is set to "1", and the valid flag of an invalid member ID is set to "0". For example, the valid flag which is correlated with the member ID of a consumer losing qualification of a member is set to "0".

The settlement server 9 is a server for performing settlement processing such as the card settlement and the electronic settlement. The settlement server 9 may be connected to a point-of-sales (POS) terminal, and may perform settlement processing via the POS terminal. Well-known processing can be applied as it is for the settlement processing. Therefore, a detailed description thereof will be omitted.

The shelf control apparatus 6 is an example of a control device of the POS system. The shelf control apparatus 6 includes a commodity data file 61.

Figures 4, 5:
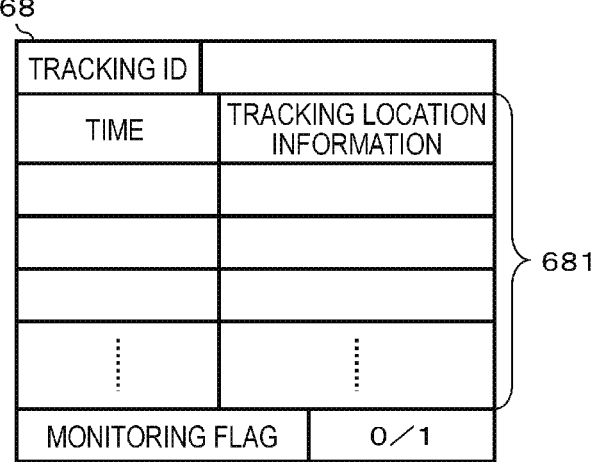
FIG. 4 is a schematic diagram illustrating an example of a data structure of a commodity data file.
FIG. 5 is a schematic diagram illustrating an example of a data structure of a tracking file.

The commodity data file 61 stores data related to the respective commodities A to F displayed on the shelf 10. An example of a data structure of the commodity data file 61 is illustrated in FIG. 4. As illustrated in the drawing, the commodity data file 61 stores a commodity name, a unit weight, and a sensor number in correlation with commodity codes of the respective commodities A to F. The unit weight is a weight per commodity. The sensor number is a number for identifying the commodity monitoring sensor 1 respectively provided in the sections 201 to 206 of the shelf 10 on which the commodity is displayed. A unique sensor number is assigned to each commodity monitoring sensor 1. The data stored in the commodity data file 61 is not limited to the items described above. Data of other items may be stored in the commodity data file 61.

The shelf control apparatus 6 has functions as a tracking processing unit 62, a personal authentication processing unit 63, a commodity monitoring processing unit 64, a behavior monitoring processing unit 65, a voice synthesizing unit 66, and an integrated processing unit 67.

The tracking processing unit 62 fetches image data from the tracking sensors 21 and 22. The tracking processing unit 62 analyzes the image data and tracks the movement of the consumer staying in the tracking area 111. The tracking processing unit 62 stores movement data in the tracking file 68 for each consumer.

An example of a data structure of the tracking file 68 is illustrated in FIG. 5. As illustrated in the drawing, the tracking file 68 includes an area of a tracking ID, an area of movement data 681, and an area of a monitoring flag. The tracking ID is a unique code set by the tracking processing unit 62 for identifying a consumer to be tracked. The movement data 681 describes tracking location information indicating a place where the consumer to be tracked stays and time at that time in time series. The tracking location information is represented by, for example, X-Y plane coordinates in which a point at a lower left corner of the tracking area 111 is set to an origin O (0,0) in FIG. 2. The monitoring flag is 1-bit data for indicating whether the consumer to be tracked moves from the inside of the fourth boundary line 104 to the outside thereof. In the embodiment, the monitoring flag stored in the tracking file 68 of the consumer who moves from the inside of the fourth boundary line 104 to the outside thereof is set to "1", and the rest of monitoring flags stored in the tracking file 68 is set to "0".

The personal authentication processing unit 63 fetches the data read by the readers of the personal authentication devices 41 and 42, and performs processing related to personal authentication of the consumer. The personal authentication processing unit 63 cooperates with the integrated processing unit 67 to perform the processing related to the personal authentication. The personal authentication processing unit 63 outputs an authentication result to the personal authentication devices 41 and 42. The personal authentication devices 41 and 42 have a function of notifying the authentication result. For example, the personal authentication devices 41 and 42 include a display device, and display the authentication result on the display device.

The commodity monitoring processing unit 64 fetches weight data from the commodity monitoring sensor 1. The commodity monitoring processing unit 64 monitors states of the respective commodities A to F displayed on the shelf 10 based upon the weight data. Specifically, when the weight data from the commodity monitoring sensor 1 decreases, the commodity monitoring processing unit 64 recognizes that a commodity is taken from the section in which the commodity monitoring sensor 1 is provided. When the weight data from the commodity monitoring sensor 1 increases, the commodity monitoring processing unit 64 recognizes that a commodity is placed in the section where the commodity monitoring sensor 1 is provided. A recognition result of the commodity monitoring processing unit 64 is given to the integrated processing unit 67.

The behavior monitoring processing unit 65 fetches an output signal from the behavior monitoring sensor 3. The behavior monitoring processing unit 65 monitors a behavior of a purchaser staying in the purchase area 112 with respect to the shelf 10 based upon the output signal. Specifically, when the behavior monitoring sensor 3 detects the hand of the consumer placed on the shelf 10, the behavior monitoring processing unit 65 recognizes the detection of the hand as the hand reaching-out behavior, and when the hand is not detected, the behavior monitoring processing unit 65 recognizes the hand returning behavior. A recognition result of the behavior monitoring processing unit 65 is given to the integrated processing unit 67. Here, behavior location information of a location where the behavior monitoring sensor 3 detects the hand is also given to the integrated processing unit 67. The behavior location information is represented by an X coordinate indicating a distance from the origin O of the above-described X-Y plane coordinates and a Z coordinate indicating a height from a floor surface.

The voice synthesizing unit 66 is connected to a speaker 5. The voice synthesizing unit 66 synthesizes voice data under the control of the integrated processing unit 67, and outputs the synthesized voice data to the speaker 5. Accordingly, the speaker 5 emits a voice message or the like. The speaker 5 is installed near the shelf 10. The speaker 5 may be installed in, for example, a standby place of a clerk. Alternatively, the speaker 5 may be built in a terminal carried by the clerk, and the voice synthesized by the voice synthesizing unit 66 may be emitted from the speaker 5. Here, the voice data synthesized by the voice synthesizing unit 66 is transmitted to the access point AP via the communication network NW, and further transmitted to the portable terminal of the clerk via wireless communication.

The integrated processing unit 67 performs data processing necessary for the store system 100 in cooperation with the commodity data file 61, the tracking processing unit 62, the personal authentication processing unit 63, the commodity monitoring processing unit 64, the behavior monitoring processing unit 65, and the voice synthesizing unit 66. As one of the data processing, there is processing of correlating a consumer whose authentication is successful in the personal authentication processing unit 63 with a consumer whose movement is tracked in the tracking processing unit 62. The integrated processing unit 67 includes a correlation table 69 as a data table to be used in the processing.

An example of a data structure of the correlation table 69 is illustrated in FIG. 6. As illustrated in the drawing, the correlation table 69 includes an area for storing the member ID of a consumer and the tracking ID set for the consumer in correlation with each other.

In one of the data processing executed by the integrated processing unit 67, there is processing of specifying the behavior of the consumer with respect to the commodity based upon a tracking result of the tracking processing unit 62 and a monitoring result of the behavior monitoring processing unit 65. The integrated processing unit 67 outputs a purchase notification command or a return notification command to the sales management apparatus 7 based upon the behavior of the consumer specified in the processing. The purchase notification command and the return notification command will be clarified in an operation which will be described later.

The sales management apparatus 7 includes a purchase list 71. The purchase list 71 is generated for each consumer. FIG. 7 illustrates an example of a data structure of the purchase list 71. As illustrated in the drawing, the purchase list 71 stores purchased commodity data of a consumer in correlation with the member ID of the consumer. The purchased commodity data includes each item of a commodity code, a commodity name, a unit price, a number, an amount of money, a temporary registration flag, and another member ID. The amount of money is calculated by multiplying the unit price and the number of commodities. The purchased commodity data may include an item other than the above-described items.

When receiving the purchase notification command, the sales management apparatus 7 registers the purchased commodity data in the purchase list 71. When receiving the return notification command, the sales management apparatus 7 corrects the corresponding purchased commodity data.

The temporary registration flag is 1-bit data for indicating whether the corresponding purchased commodity data is temporary registration data. In the embodiment, the temporary registration flag with respect to the temporary registration data is set to "1", and the temporary registration flag with respect to non-temporary registration data, that is, main registration data is set to "0". When the corresponding purchased commodity data is temporarily registered, the member ID of another related consumer is added to the purchase list 71 as the another member ID. The temporary registration flag may be referred to as a temporary deregistration flag.

FIG. 8 is a block diagram illustrating a hardware configuration of the shelf control apparatus 6. The shelf control apparatus 6 includes a processor 601, a main memory 602, an auxiliary storage device 603, a clock 604, a communication interface 605, an I/O interface 606, and a system transmission line 607. The processor 601, the main memory 602, the auxiliary storage device 603, the clock 604, the communication interface 605, and the I/O interface 606 are respectively connected to the system transmission line 607. The system transmission line 607 includes an address bus, a data bus, and a control signal line. In the shelf control apparatus 6, the processor 601, the main memory 602, and the auxiliary storage device 603 are connected by the system transmission line 607, and a computer for controlling the shelf control apparatus 6 is configured.

The processor 601 corresponds to a central portion of the computer. The processor 601 controls each unit to perform various functions as the shelf control apparatus 6 according to an operating system or an application program. The processor 601 is, for example, a central processing unit (CPU).

The main memory 602 corresponds to a main storage portion of the computer. The main memory 602 includes a non-volatile memory area and a volatile memory area. The main memory 602 stores the operating system or the application program in the non-volatile memory area. The main memory 602 stores data necessary for the processor 601 to execute processing for controlling each unit in the volatile memory area. The main memory 602 uses the volatile memory area as a work area in which the data is appropriately rewritten by the processor 601. The non-volatile memory area is, for example, a read only memory (ROM). The volatile memory area is, for example, a random access memory (RAM).

The auxiliary storage device 603 corresponds to an auxiliary storage portion of the computer. As the auxiliary storage device 603, for example, well-known storage devices such as an electric erasable programmable read-only memory (EEPROM), a hard disc drive (HDD) or a solid state drive (SSD) are used independently or in combination. The auxiliary storage device 603 stores data to be used for the processor 601 to perform various processing and data generated by the processing of the processor 601. The auxiliary storage device 603 may store the application program.

The main memory 602 or the auxiliary storage device 603 is used as a storage area for the tracking file 68, the correlation table 69, and the commodity data file 61 described above.

The clock 604 functions as a time information source of the shelf control apparatus 6. The processor 601 tracks current date and time based upon time information tracked by the clock 604.

The communication interface 605 is a circuit for performing data communication with other devices connected via the communication network NW. Other devices include the sales management apparatus 7, the member server 8, the settlement server 9.

The I/O interface 606 is a circuit for transmitting and receiving a data signal between the commodity monitoring sensor 1, the tracking sensors 21 and 22, the behavior monitoring sensor 3, the personal authentication devices 41 and 42, and the speaker 5 described above.

The shelf control apparatus 6 having the above-described configuration is provided, for example, on an upper surface or a back surface of the shelf 10. The shelf control apparatus 6 is connected to the communication network NW by wire communication or wireless communication.

A computer mainly formed of the processor 601 performs data processing according to a control program installed in the main memory 602 or the auxiliary storage device 603, thereby performing the functions of the tracking processing unit 62, the personal authentication processing unit 63, the commodity monitoring processing unit 64, the behavior monitoring processing unit 65, the voice synthesizing unit 66, and the integrated processing unit 67. Next, with reference to flowcharts illustrated in FIGS. 9 to 24, main operations of the tracking processing unit 62, the personal authentication processing unit 63, the commodity monitoring processing unit 64, the behavior monitoring processing unit 65, the voice synthesizing unit 66, and the integrated processing unit 67 will be described. The function of each unit will be clarified by the description of the operations. The following description is an example. When the same result is obtained, the procedure is not particularly limited.

A method of installing the control program in the main memory 602 or the auxiliary storage device 603 is not particularly limited. The control program is recorded on a removable recording medium or the control program is distributed by communication via a network, thereby making it possible to install the control program in the main memory 602 or the auxiliary storage device 603. The recording medium may have any applicable form as long as a medium such as a CD-ROM and a memory card in which a program can be stored is provided, and the medium can be read by an apparatus.

Figure 9:
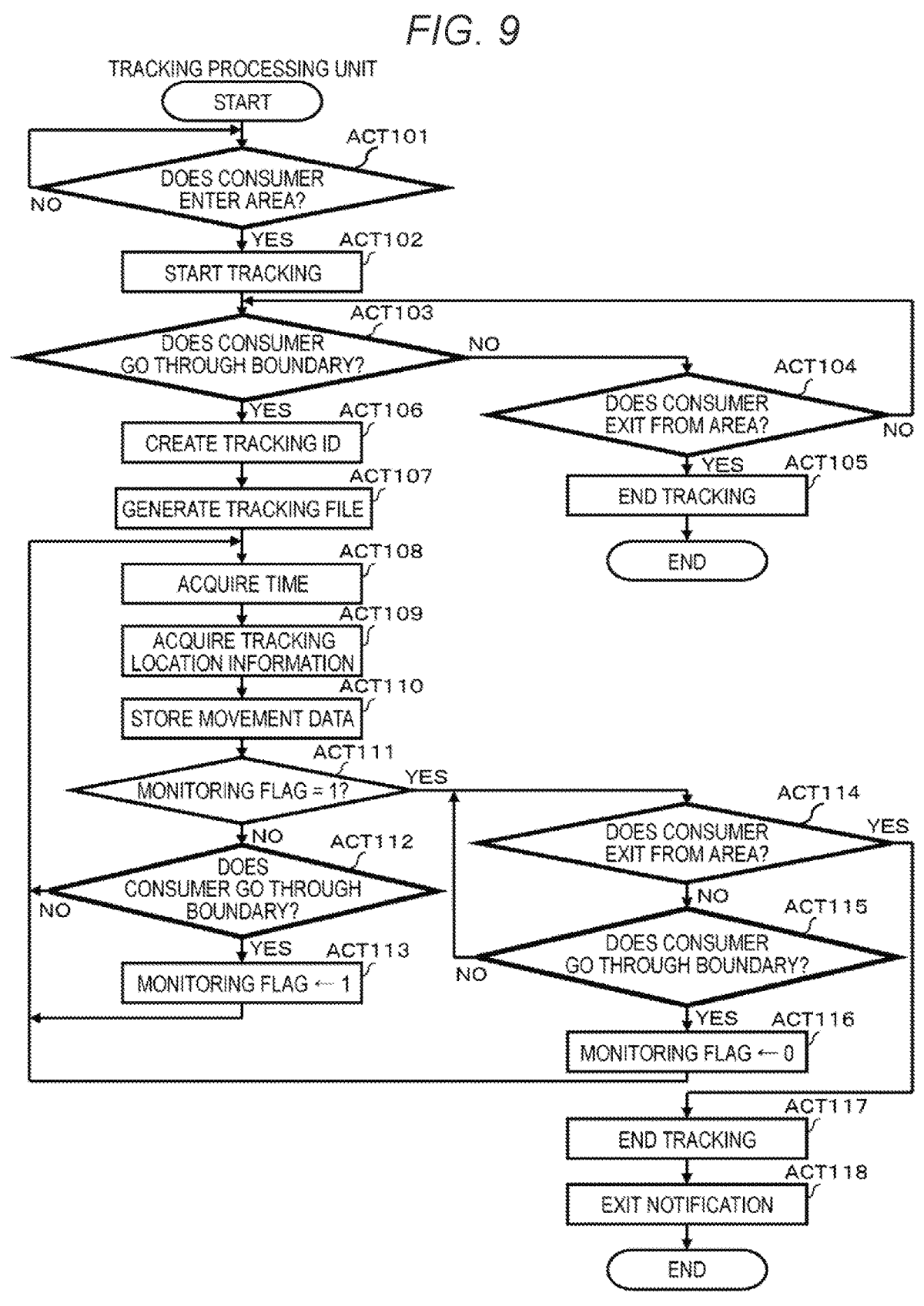

First, an operation of the tracking processing unit 62 will be described with reference to FIG. 9.

The tracking processing unit 62 waits for a person to enter the tracking area 111 across the first boundary line 101 as ACT 101. Here, not only a consumer but also a person related to a store such as a clerk can be considered as the person who enters the tracking area 111. However, here, for convenience of description, the person is limited to the consumer. Therefore, hereinafter, the person is referred to as the consumer.

When detecting that the consumer enters the tracking area 111 based upon the image data fetched from the tracking sensors 21 and 22, the tracking processing unit 62 determines YES in ACT 101, and proceeds to ACT 102. The tracking processing unit 62 starts tracking of the consumer as ACT 102. Hereinafter, the tracked consumer will be referred to as a consumer SA.

The tracking processing unit 62 determines whether the consumer SA enters the tracking area 111 inside the fourth boundary line 104 across the fourth boundary line 104 as ACT 103. When the consumer SA does not enter the tracking area 111 inside the fourth boundary line 104, the tracking processing unit 62 determines NO in ACT 103, and proceeds to ACT 104. The tracking processing unit 62 determines whether the consumer SA exits from the tracking area 111 across the first boundary line 101 as ACT 104. When the consumer SA does not exit from the tracking area 111, the tracking processing unit 62 determines NO in ACT 104, and returns to ACT 103. Here, in ACT 103 and ACT 104, the tracking processing unit 62 waits for the consumer SA to enter the tracking area 111 inside the fourth boundary line 104 or exit from the tracking area 111.

When the consumer SA exits from the tracking area 111 without entering the tracking area 111 inside the fourth boundary line 104 in a standby state of ACT 103 and ACT 104, the tracking processing unit 62 determines YES in ACT 104, and proceeds to ACT 105. The tracking processing unit 62 ends the tracking of the consumer SA as ACT 105. Therefore, the tracking processing unit 62 ends the operation of the procedure illustrated in a flowchart of FIG. 9.

In the standby state of ACT 103 and ACT 104, when the consumer SA enters the tracking area 111 inside the fourth boundary line 104, the tracking processing unit 62 determines YES in ACT 103, and proceeds to ACT 106. The tracking processing unit 62 assigns a unique tracking ID to the consumer SA as ACT 106. Next, the tracking processing unit 62 generates the tracking file 68 in which the tracking ID is described as ACT 107. Here, the tracking processing unit 62 sets the monitoring flag to "0". Hereinafter, the tracking file 68 in which the tracking ID of the consumer SA is described is referred to as a tracking file 680.

The tracking processing unit 62 acquires time tracked by the clock 604 as ACT 108. The tracking processing unit 62 acquires tracking location information at this time of the consumer SA as ACT 109. The tracking processing unit 62 stores movement data in which the tracked time and the tracking location information are correlated with each other in the tracking file 680 as ACT 110.

The tracking processing unit 62 checks the monitoring flag of the tracking file 680 as ACT 111. Here, the monitoring flag is "0". Therefore, the tracking processing unit 62 determines NO in ACT 111, and proceeds to ACT 112. The tracking processing unit 62 determines whether the consumer SA exits to the tracking area 111 outside the fourth boundary line 104 across the fourth boundary line 104 as ACT 112. When the consumer SA does not exit to the tracking area 111 outside the fourth boundary line 104, the tracking processing unit 62 determines NO in ACT 112, and returns to ACT 108. Next, the tracking processing unit 62 executes the processing after ACT 108 in the same manner as above. That is, the tracking processing unit 62 stores, in the tracking file 680, the movement data including the time tracked by the clock 604 and the tracking location information of the consumer SA at that time.

The tracking processing unit 62 repeatedly executes the processing of storing the movement data in the tracking file 680 until the consumer SA exits to the tracking area 111 outside the fourth boundary line 104. When the consumer SA exits to the tracking area 111 outside the fourth boundary line 104, the tracking processing unit 62 determines YES in ACT 112, and proceeds to ACT 113. The tracking processing unit 62 changes the monitoring flag of the tracking file 680 to "1" as ACT 113. Next, the tracking processing unit 62 returns to ACT 108 and executes the processing after ACT 108 again. Here, the monitoring flag is "1". Therefore, the tracking processing unit 62 determines YES in ACT 111, and proceeds to ACT 114.

The tracking processing unit 62 determines whether the consumer SA exits to the outside of the tracking area 111 as ACT 114. When the consumer SA does not exit to the outside of the tracking area 111, the tracking processing unit 62 determines NO in ACT 114, and proceeds to ACT 115. The tracking processing unit 62 determines whether the consumer SA returns to the tracking area 111 inside the fourth boundary line 104 across the fourth boundary line 104 again as ACT 115. When the consumer SA does not return to the tracking area 111 inside the fourth boundary line 104, the tracking processing unit 62 determines NO in ACT 115, and returns to ACT 114. Here, the tracking processing unit 62 waits for the consumer SA to exit to the outside of the tracking area 111 or return to the tracking area 111 inside the fourth boundary line 104 in ACT 114 and ACT 115.

In a standby state of ACT 114 and ACT 115, when the consumer SA returns to the tracking area 111 inside the fourth boundary line 104, the tracking processing unit 62 determines YES in ACT 115, and proceeds to ACT 116. The tracking processing unit 62 changes the monitoring flag of the tracking file 680 to "0" as ACT 116. Next, the tracking processing unit 62 returns to the processing of ACT 108. Therefore, the tracking processing unit 62 repeatedly executes the processing of ACT 108 to ACT 112 until the consumer SA exits to the tracking area 111 outside the fourth boundary line 104 again.

In the standby state of ACT 114 and ACT 115, when the consumer SA exits to the outside of the tracking area 111, the tracking processing unit 62 determines YES in ACT 114, and proceeds to ACT 117. The tracking processing unit 62 ends the tracking of the consumer SA as ACT 117. The tracking processing unit 62 outputs an exit notification command to the integrated processing unit 67 as ACT 118. The exit notification command includes the member ID of the tracking file 680. Next, the tracking processing unit 62 ends the operation of the procedure illustrated in the flowchart of FIG. 9.

As described above, when the consumer SA enters the inside of the fourth boundary line 104 of the tracking area 111, the tracking processing unit 62 assigns a unique tracking ID to the consumer SA. Next, the tracking processing unit 62 generates the tracking file 680 in which the unique tracking ID is described.

The tracking processing unit 62 starts tracking of the consumer SA. The tracking processing unit 62 continues the tracking thereof until the consumer SA exits to the outside of the tracking area 111. When the consumer SA exits to the outside of the tracking area 111, the tracking processing unit 62 ends the tracking of the consumer. Meanwhile, the tracking processing unit 62 stores the movement data of the consumer SA in the tracking file 680. When the consumer SA exits to the outside of the tracking area 111, the tracking processing unit 62 outputs the exit notification command to the integrated processing unit 67. An operation of the integrated processing unit 67 to which the exit notification command is inputted will be described later with reference to FIG. 19.

Next, an operation of the personal authentication processing unit 63 will be described with reference to FIG. 10.

The personal authentication processing unit 63 waits for data for the personal authentication to be read by the readers of the personal authentication devices 41 and 42 as ACT 201.

The consumer SA is required to receive the personal authentication as a member before purchasing a commodity. Therefore, the consumer SA starts the shopping application installed in the user terminal TM. When the shopping application starts, the code of the member ID is displayed on the display of the user terminal TM. Next, the consumer SA causes the reader of any one of the personal authentication devices 41 and 42 to read the code. Next, data indicated by the code is outputted from the personal authentication devices 41 and 42 to the personal authentication processing unit 63. A device ID for identifying the personal authentication devices 41 and 42 is added to the data.

When the data is inputted to the personal authentication processing unit 63 from the personal authentication devices 41 and 42, the personal authentication processing unit 63 determines whether the inputted data is data representing the code of the member ID. In the case of the data representing the code of the member ID, the personal authentication processing unit 63 determines YES in ACT 201, and proceeds to ACT 202. The personal authentication processing unit 63 acquires the device ID added to the data as ACT 202. The personal authentication processing unit 63 acquires the member ID from the data as ACT 203. The personal authentication processing unit 63 outputs an authentication notification command to the integrated processing unit 67 as ACT 204. The authentication notification command includes the device ID acquired in the processing of ACT 202 and the member ID acquired in the processing of ACT 203.

Here, an operation of the integrated processing unit 67 to which the authentication notification command is inputted will be described with reference to FIG. 13.

The integrated processing unit 67 acquires the device ID from the authentication notification command as ACT 501. Next, the integrated processing unit 67 selects the authentication areas 113 and 114 specified by the device ID as ACT 502. For example, when the device ID belongs to the personal authentication device 41, the integrated processing unit 67 selects the authentication area 113. For example, when the device ID belongs the personal authentication device 42, the integrated processing unit 67 selects the authentication area 114. Here, on the assumption that the authentication area 113 is selected as an example, the operation of the integrated processing unit 67 will be continuously described.

The integrated processing unit 67 acquires the number of consumers staying in the authentication area 113 as ACT 503. Specifically, the integrated processing unit 67 cooperates with the tracking processing unit 62, and retrieves the tracking file 68 that stores the movement data in which the tracking location information corresponding to the time when the authentication notification command is outputted matches the authentication location information with respect to the authentication area 113. The number of corresponding tracking files 68 becomes the number of consumers staying in the authentication area 113. The authentication location information is an aggregate of X-Y plane coordinates in the authentication area 113. The authentication location information with respect to the authentication area 113 is set in the auxiliary storage device 603 in advance.

The integrated processing unit 67 determines whether the number of consumers staying in the authentication area 113 is one as ACT 504. When the number of consumers is one, that is, when only the consumer SA stays in the authentication area 113, the integrated processing unit 67 determines YES in ACT 504, and proceeds to ACT 505. The integrated processing unit 67 acquires the member ID from the authentication notification command as ACT 505. Next, the integrated processing unit 67 transmits an authentication request command to the member server 8. The authentication request command includes the member ID acquired in the processing of ACT 505, that is, the member ID of the consumer SA.

The member server 8 determines validity of the member ID. Specifically, the member server 8 retrieves the member database 81 with the member ID included in the authentication request command. As a result, when the valid flag corresponding to the member ID is "1", the member server 8 determines that the member ID is valid. When the valid flag corresponding to the member ID is "0", the member server 8 determines that the member ID is invalid. The member server 8 returns a validity determination result of the member ID to the integrated processing unit 67.

The integrated processing unit 67 confirms the validity of the member ID as ACT 507. When the member server 8 determines that the member ID is valid, the integrated processing unit 67 determines YES in ACT 507, and proceeds to ACT 508. The integrated processing unit 67 acquires the tracking ID from the tracking file 680 of the consumer SA staying in the authentication area 113 as ACT 508. That is, the integrated processing unit 67 acquires the tracking ID from the tracking file 68 that stores the movement data in which the tracking location information corresponding to the time when the authentication notification command is outputted matches the authentication location information with respect to the authentication area 113. Next, as ACT 509, the integrated processing unit 67 stores the tracking ID acquired in the processing of ACT 508 and the member ID acquired in the processing of ACT 505 in correlation with each other in the correlation table 69.

The integrated processing unit 67 instructs the sales management apparatus 7 to generate the purchase list 71 as ACT 510. According to the instruction, in the sales management apparatus 7, the purchase list 71 identified by the member ID acquired in the processing of ACT 505 is generated. Hereinafter, the purchase list 71 identified by the member ID of the consumer SA will be referred to as a purchase list 711.

The integrated processing unit 67 outputs a permission response command to the personal authentication processing unit 63 as ACT 511.

On the other hand, in ACT 504, when there is no consumer staying in the authentication area 113, or when there are two or more consumers staying therein, the integrated processing unit 67 determines NO, and proceeds to ACT 512. Even when it is determined that the member is not a valid member in ACT 507, the integrated processing unit 67 determines NO, and proceeds to ACT 512. The integrated processing unit 67 outputs an error response command to the personal authentication processing unit 63 as ACT 512.

Figure 13:
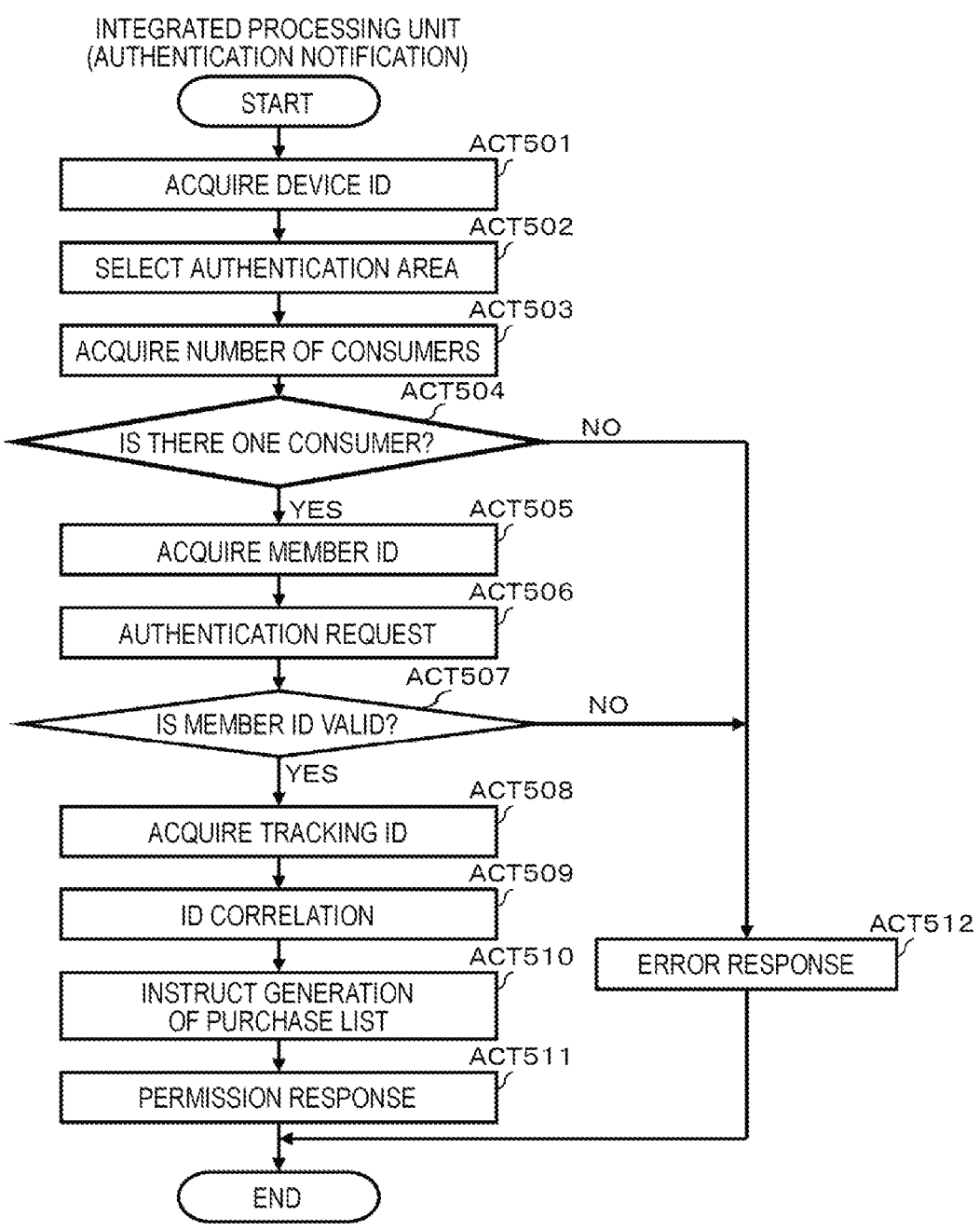
FIG. 13 is a flowchart illustrating an operation procedure of an integrated processing unit to which an authentication notification command is inputted.

When outputting the permission response command or the error response command to the personal authentication processing unit 63, the integrated processing unit 67 ends the operation of the procedure illustrated in a flowchart of FIG. 13.

Figure 10:
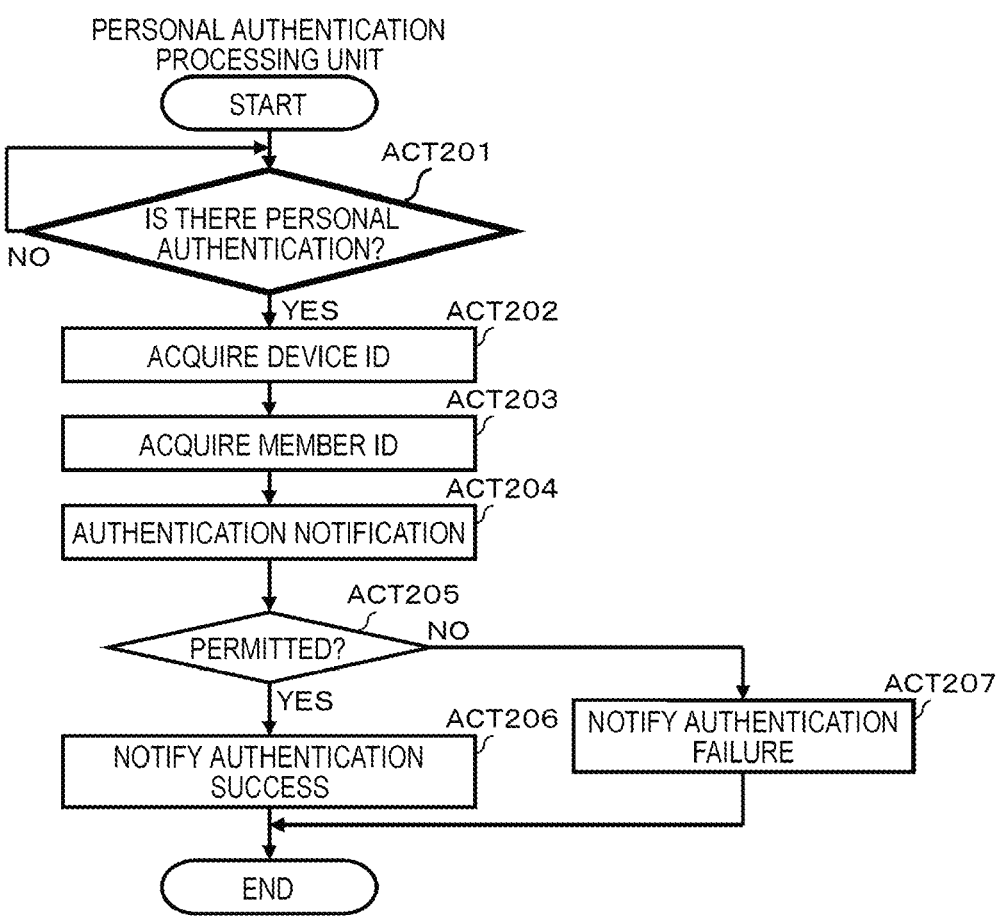
FIG. 10 is a flowchart illustrating an operation procedure of a personal authentication processing unit.

Referring back to the description of FIG. 10, the personal authentication processing unit 63 that outputs the authentication notification command in ACT 204 waits for a response command from the integrated processing unit 67 as ACT 205. Here, when the permission response command is inputted, the personal authentication processing unit 63 determines YES in ACT 205, and proceeds to ACT 206. As ACT 206, the personal authentication processing unit 63 controls the personal authentication device 41 so that the personal authentication device 41 in the authentication area 113 notifies that the authentication is successful. Therefore, for example, a message that "authentication is successful. Please start shopping" is displayed on the display device of the personal authentication device 41.

On the other hand, when the error response command is inputted, the personal authentication processing unit 63 determines NO in ACT 205, and proceeds to ACT 207. As ACT 207, the personal authentication processing unit 63 controls the personal authentication device 41 so that the personal authentication device 41 in the authentication area 113 notifies that the authentication fails. Therefore, for example, a message that "authentication fails" is displayed on the display device of the personal authentication device 41. As described above, the personal authentication processing unit 63 ends the operation of the procedure illustrated in a flowchart of FIG. 10.

Thus, for example, when the consumer SA enters the authentication area 113 and causes the reader of the personal authentication device 41 to read the member ID, the personal authentication processing unit 63 outputs the authentication notification command to the integrated processing unit 67. In response to the authentication notification command, the integrated processing unit 67 acquires the number of consumers staying in the authentication area 113. When the number of persons is one, the integrated processing unit 67 cooperates with the member server 8 to determine the validity of the member ID. When the validity of the member ID is approved, the integrated processing unit 67 outputs the permission response command to the personal authentication processing unit 63. The personal authentication processing unit 63 to which the permission response command is inputted notifies the success of the authentication via the personal authentication device 41.

On the other hand, when the validity of the member ID is not approved, the integrated processing unit 67 outputs the error response command to the personal authentication processing unit 63. In response to the error response command, the personal authentication processing unit 63 notifies authentication failure via the personal authentication device 41.

The integrated processing unit 67 does not determine the validity of the member ID when the number of consumers staying in the authentication area 113 is not one. Even here, the integrated processing unit 67 outputs the error response command to the personal authentication processing unit 63. In response to the error response command, the personal authentication processing unit 63 notifies the authentication failure via the personal authentication device 41.

For example, when only the consumer SA stays in the authentication area 113, the consumer who can cause the reader of the personal authentication device 41 to read the member ID is limited to the consumer SA. Therefore, the member ID read by the reader and the tracking ID assigned to the consumer SA can be correlated with each other. On the other hand, when another consumer SB other than the consumer SA stays in the authentication area 113, the consumer who can cause the reader of the personal authentication device 41 to read the member ID is not limited to the consumer SA. The consumer SB can also cause the reader thereof to read the member ID. Therefore, the integrated processing unit 67 does not determine the validity of the member ID when the number of consumers staying in the authentication area 113 is not one. As a result, the member ID and the tracking ID are not erroneously correlated with each other.

The consumer SA who succeeds in the personal authentication by the member ID can purchase the commodities A to F displayed on the shelf 10. For example, when purchasing the commodity A displayed in the section 201 of the shelf 10, the consumer SA takes out the commodity A from the section 201. Hereinafter, such behavior of the consumer SA is referred to as a purchase behavior. When canceling the purchase of the commodity A previously taken therefrom, the consumer SA returns the commodity A to the original section 201. Hereinafter, such behavior of the consumer SA is referred to as a return behavior. With respect to the purchase behavior or the return behavior, the commodity monitoring processing unit 64, the behavior monitoring processing unit 65, and the integrated processing unit 67 operate in cooperation with each other, such that the shelf control apparatus 6 can register the purchased commodity data of the consumer SA in the purchase list 711.

Therefore, first, an operation of the commodity monitoring processing unit 64 will be described with reference to FIG. 11.

In the purchase behavior, it is prohibited for the consumer SA to take out commodities of a plurality of items at the same time. In the return behavior, it is also prohibited for the consumer SA to take out a commodity or another commodity without withdrawing the hand with which the commodity is returned. Meanwhile, the consumer SA is allowed to take out and return a plurality of commodities of one item at the same time.

The commodity monitoring processing unit 64 waits for a weight change detected by the commodity monitoring sensor 1 as ACT 301. For example, when the consumer SA performs the purchase behavior with respect to the commodity A, the commodity monitoring sensor 1 in the section 201 detects a weight change in a decreasing direction. For example, when the consumer SA performs the return behavior with respect to the commodity A, the commodity monitoring sensor 1 in the section 201 detects a weight change in an increasing direction.

When the commodity monitoring sensor 1 detects the weight change, the commodity monitoring processing unit 64 determines YES in ACT 301, and proceeds to ACT 302. The commodity monitoring processing unit 64 acquires a sensor number of the commodity monitoring sensor 1 that detects the weight change as ACT 302. Here, the commodity monitoring processing unit 64 acquires the sensor number of the commodity monitoring sensor 1 provided in the section 201, for example, "001".

As ACT 303, the commodity monitoring processing unit 64 determines whether the commodity monitoring sensor 1 detects the weight change in the decreasing direction or the weight change in the increasing direction. When detecting the weight change in the decreasing direction, the commodity monitoring processing unit 64 determines YES in ACT 304, and proceeds to ACT 305. The commodity monitoring processing unit 64 outputs a decrease notification command to the integrated processing unit 67 as ACT 305.

When detecting the weight change in the increasing direction, the commodity monitoring processing unit 64 determines NO in ACT 304, and proceeds to ACT 306. The commodity monitoring processing unit 64 outputs an increase notification command to the integrated processing unit 67 as ACT 306.

The decrease notification command or the increase notification command includes the sensor number acquired in the processing of ACT 302 and the weight change amount calculated in the processing of ACT 303. As described above, the commodity monitoring processing unit 64 ends the operation of the procedure illustrated in a flowchart of FIG. 11.

Next, an operation of the behavior monitoring processing unit 65 will be described with reference to FIG. 12.

The behavior monitoring processing unit 65 waits for the hand of the consumer SA to be detected by the behavior monitoring sensor 3 as ACT 401. When the consumer SA in the purchase area 112 reaches out the hand to the shelf 10, the behavior monitoring sensor 3 detects the hand. When the hand is detected, the behavior monitoring processing unit 65 determines YES in ACT 401, and proceeds to ACT 402. The behavior monitoring processing unit 65 acquires behavior location information of a location where the hand of the consumer SA is detected as ACT 402. The behavior monitoring processing unit 65 outputs a hand reaching-out notification command to the integrated processing unit 67 as ACT 403. The hand reaching-out notification command includes the behavior location information acquired in the processing of ACT 402.

The behavior monitoring processing unit 65 waits for the hand of the consumer SA to be undetected as ACT 404. When the behavior monitoring sensor 3 does not detect the hand of the consumer SA, the behavior monitoring processing unit 65 determines YES in ACT 404, and proceeds to ACT 405. The behavior monitoring processing unit 65 outputs a hand returning notification command to the integrated processing unit 67 as ACT 405. The hand returning notification command also includes the behavior location information acquired in the processing of ACT 402.

As described, when the consumer SA reaches out the hand to the shelf 10 to take out the commodity A from the section 201, the behavior monitoring sensor 3 first detects the hand of the consumer SA. By the detection of the hand, the behavior monitoring processing unit 65 outputs the hand reaching-out notification command to the integrated processing unit 67. The hand reaching-out notification command includes the behavior location information indicating the location where the hand of the consumer SA is detected.

Next, when the consumer SA lifts only one commodity A from the section 201, the commodity monitoring sensor 1 in the section 201 detects the weight change in the decreasing direction. By the weight change, the decrease notification command is outputted from the commodity monitoring processing unit 64 to the integrated processing unit 67. The decrease notification command includes the sensor number of the commodity monitoring sensor 1 that detects the weight change and the weight change amount. The weight change amount matches a unit weight of the commodity A. Meanwhile, when the consumer SA lifts two commodities A together from the section 201, the weight change amount is equal to twice the unit weight of the commodity A.

Next, when the consumer SA withdraws the hand holding the commodity A from the shelf 10, the hand of the consumer SA detected by the behavior monitoring sensor 3 becomes not detected. When the hand is not detected, the hand returning notification command is outputted from the behavior monitoring processing unit 65 to the integrated processing unit 67. The hand returning notification command also includes the behavior location information indicating the location where the hand of the consumer SA is detected.

On the other hand, even when the consumer SA holds the commodity A and reaches out the hand to the shelf 10 in order to cancel the purchase of the commodity A, first, the behavior monitoring processing unit 65 outputs the hand reaching-out notification command to the integrated processing unit 67.

Next, when the consumer SA returns the commodity A to the section 201, the commodity monitoring sensor 1 in the section 201 detects the weight change in the increasing direction. By the weight change, the commodity monitoring processing unit 64 outputs the increase notification command to the integrated processing unit 67. The increase notification command includes the sensor number of the commodity monitoring sensor 1 that detects the weight change and the weight change amount. The weight change amount matches the unit weight of the commodity A. Meanwhile, when the consumer SA collectively returns two commodities A to the section 201, the weight change amount is equal to twice the unit weight of the commodity A.

After that, when the consumer SA withdraws the hand from the shelf 10, the behavior monitoring processing unit 65 outputs the hand returning notification command to the integrated processing unit 67.

As described above, with respect to the purchase behavior of the consumer SA, first, the behavior monitoring processing unit 65 outputs the hand reaching-out notification command to the integrated processing unit 67. Next, the commodity monitoring processing unit 64 outputs the decrease notification command to the integrated processing unit 67. After that, the behavior monitoring processing unit 65 outputs the hand returning notification command to the integrated processing unit 67.

When the consumer SA withdraws the hand without taking up the commodity, the decrease notification command is not outputted. That is, the hand reaching-out notification command is outputted, and then the hand returning notification command is outputted.

On the other hand, with respect to the return behavior of the consumer SA, first, the behavior monitoring processing unit 65 outputs the hand reaching-out notification command to the integrated processing unit 67. Next, the commodity monitoring processing unit 64 outputs the increase notification command to the integrated processing unit 67. After that, the behavior monitoring processing unit 65 outputs the hand returning notification command to the integrated processing unit 67.

When the consumer SA withdraws the hand without returning the commodity to the shelf 10, the increase notification command is not outputted. That is, the hand reaching-out notification command is outputted, and then the hand returning notification command is outputted.

In the purchase behavior, when the consumer SA returns a commodity to the shelf 10 without withdrawing the hand that lifts the commodity, the behavior monitoring processing unit 65 and the commodity monitoring processing unit 64 output various commands to the integrated processing unit 67 in the following order. First, the behavior monitoring processing unit 65 outputs the hand reaching-out notification command to the integrated processing unit 67. Next, the commodity monitoring processing unit 64 outputs the decrease notification command to the integrated processing unit 67. Next, the commodity monitoring processing unit 64 outputs the increase notification command to the integrated processing unit 67. After that, the behavior monitoring processing unit 65 outputs the hand returning notification command to the integrated processing unit 67. When the consumer SA returns the commodity to the same section, the sensor numbers included in the decrease notification command and the increase notification command match each other. However, when the consumer SA returns the commodity to another section, the sensor numbers included in the decrease notification command and the increase notification command are different from each other.

As described above, with respect to the purchase behavior or the return behavior of the consumer, the behavior monitoring processing unit 65 should output the hand reaching-out notification command to the integrated processing unit 67. Here, an operation of the integrated processing unit 67 to which the hand reaching-out notification command is inputted will be described with reference to FIG. 14.

The integrated processing unit 67 acquires behavior location information from the hand reaching-out notification command as ACT 521. Next, the integrated processing unit 67 stores the acquired behavior location information as ACT 522. A storage destination of the behavior location information is, for example, the main memory 602. The storage destination of the behavior location information may be the auxiliary storage device 603.

The integrated processing unit 67 determines whether the decrease notification command is inputted as ACT 523. When the decrease notification command is not inputted, the integrated processing unit 67 determines NO in ACT 523, and proceeds to ACT 524. The integrated processing unit 67 determines whether the increase notification command is inputted as ACT 524. When the increase notification command is not inputted, the integrated processing unit 67 determines NO in ACT 524, and proceeds to ACT 525. The integrated processing unit 67 determines whether the hand returning notification command is inputted as ACT 525. When the hand returning notification command is not inputted, the integrated processing unit 67 returns to ACT 523. Here, the integrated processing unit 67 waits for the decrease notification command, the increase notification command, or the hand returning notification command to be inputted as ACT 523 to ACT 525.

In a standby state of ACT 523 to ACT 525, when the hand returning notification command is inputted, the integrated processing unit 67 determines YES in ACT 525, and proceeds to ACT 526. The integrated processing unit 67 clears the behavior location information as ACT 526. Next, the integrated processing unit 67 ends the operation of the procedure illustrated in a flowchart of FIG. 14.

As such, when the hand reaching-out notification command is inputted but the hand returning notification command is inputted while the decrease notification command or the increase notification command is not inputted, the integrated processing unit 67 does not execute any special processing. That is, when the consumer SA who performs the purchase behavior withdraws the hand without taking up the commodity, or, when the consumer SA who performs the return behavior withdraws the hand without returning the commodity, the integrated processing unit 67 does not execute any special processing.

In the standby state of ACT 523 to ACT 525, when the decrease notification command is inputted, the integrated processing unit 67 determines YES in ACT 523, and proceeds to ACT 527. The integrated processing unit 67 determines whether the increase notification command is inputted as ACT 527. When the increase notification command is not inputted, the integrated processing unit 67 determines NO in ACT 527, and proceeds to ACT 528. The integrated processing unit 67 determines whether the hand returning notification command is inputted as ACT 528. When the return notification command is not inputted, the integrated processing unit 67 determines NO in ACT 528, and returns to ACT 527. Here, the integrated processing unit 67 waits for the increase notification command or the hand returning notification command to be inputted as ACT 527 and ACT 528.

In a standby state of ACT 527 and ACT 528, when the increase notification command is inputted, the integrated processing unit 67 determines YES in ACT 527, and returns to ACT 523. That is, the integrated processing unit 67 returns to the standby state of ACT 523 to ACT 525.

In the standby state of ACT 527 and ACT 528, when the hand returning notification command is inputted, the integrated processing unit 67 determines YES in ACT 528, and proceeds to ACT 529. The integrated processing unit 67 executes purchase processing as ACT 529. Details of the purchase processing will be described later. When the purchase processing is ended, the integrated processing unit 67 ends the operation of the procedure illustrated in the flowchart of FIG. 14.

As such, the integrated processing unit 67 executes the purchase processing when the decrease notification command is inputted after the hand reaching-out notification command is inputted, and continuously the hand returning notification command is inputted. That is, when the consumer SA performs the purchase behavior, the integrated processing unit 67 executes the purchase processing.

The integrated processing unit 67 does not execute any special processing when the decrease notification command is inputted after the hand reaching-out notification command is inputted, and further the hand returning notification command is inputted after the increase notification command is inputted. That is, when the consumer SA immediately returns the commodity once held by the hand of the customer SA and withdraws the hand, the integrated processing unit 67 does not execute any special processing.

In the standby state of ACT 523 to ACT 525, when the increase notification command is inputted, the integrated processing unit 67 determines YES in ACT 524, and proceeds to ACT 530. The integrated processing unit 67 waits for the hand returning notification command as ACT 530. When the hand returning notification command is inputted, the integrated processing unit 67 determines YES in ACT 530, and proceeds to ACT 531. The integrated processing unit 67 executes return processing as ACT 531. Details of the return processing will be described later. When the return processing is ended, the integrated processing unit 67 ends the operation of the procedure illustrated in the flowchart of FIG. 14.

As such, the integrated processing unit 67 executes the return processing when the increase notification command is inputted after the hand reaching-out notification command is inputted, and continuously the hand returning notification command is inputted. That is, when the consumer SA performs the return behavior, the integrated processing unit 67 executes the return processing.

Figure 15:
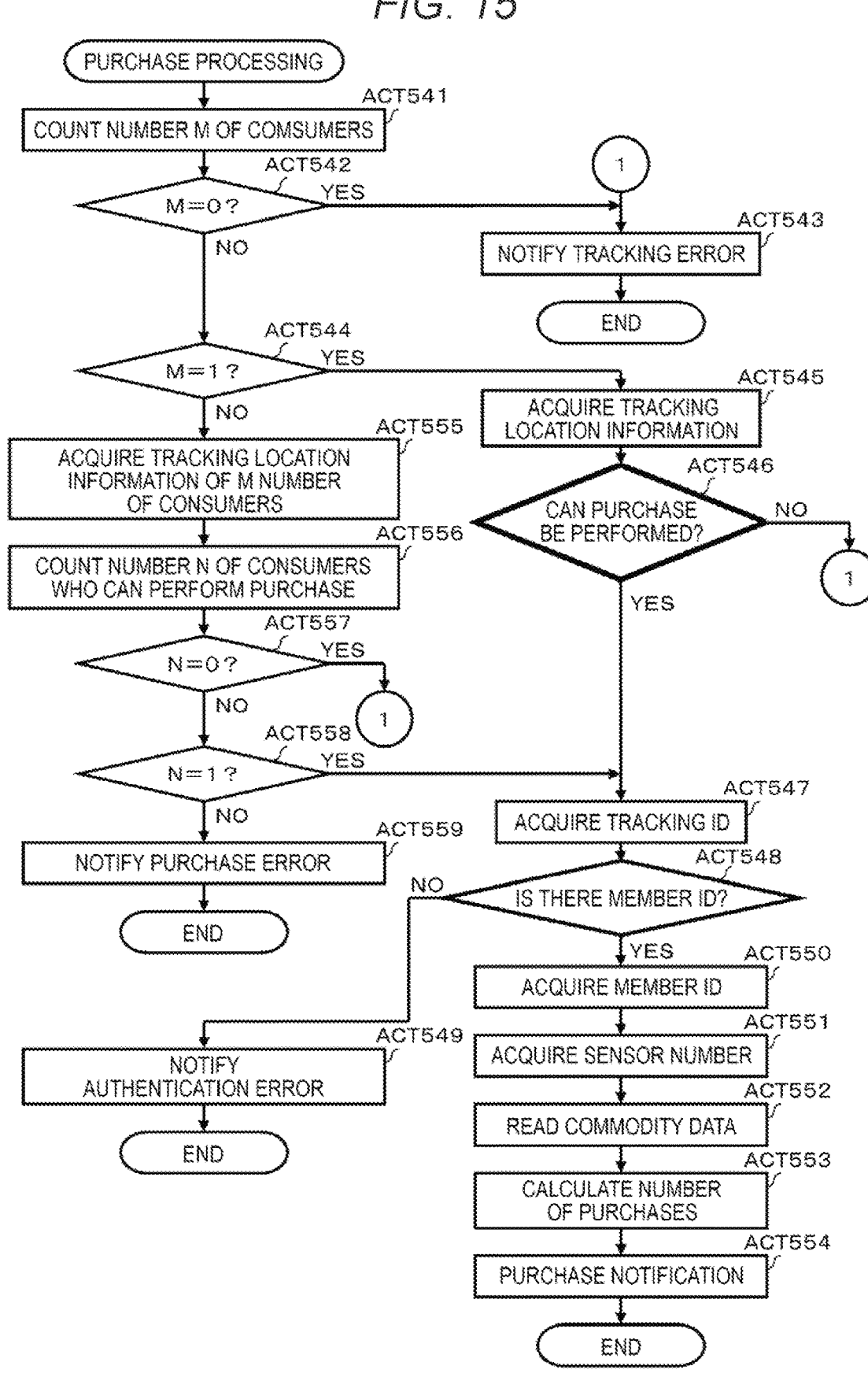
FIG. 15 is a flowchart illustrating a procedure of purchase processing.

FIG. 15 is a flowchart illustrating a procedure of a main part of the purchase processing. When the purchase processing is started, the integrated processing unit 67 counts the number M of consumers staying in the purchase area 112 as ACT 541. Specifically, the integrated processing unit 67 counts the number of tracking files 68 in which the tracking location information of the movement data corresponding to the current time in the tracking file 68 stored in the tracking processing unit 62 matches purchase location information with respect to the purchase area 112. The number of corresponding tracking files 68 becomes the number M of consumers staying in the purchase area 112. The purchase location information is an aggregate of X-Y plane coordinates in the purchase area 112. The purchase location information with respect to the purchase area 112 is set in the auxiliary storage device 603 in advance.

The integrated processing unit 67 determines whether the number M of consumers staying in the purchase area 112 is 0 as ACT 542. When the number of persons M is 0, there is a possibility that a consumer who cannot be tracked by the tracking processing unit 62 takes out the commodity from the shelf 10. Here, the integrated processing unit 67 determines YES in ACT 542, and proceeds to ACT 543. The integrated processing unit 67 outputs voice data for a tracking error to the voice synthesizing unit 66 as ACT 543. Accordingly, the voice synthesizing unit 66 synthesizes a voice message indicating the tracking error. Next, the speaker 5 outputs, for example, a voice message such as "an error occurred and shopping cannot be performed". Next, the integrated processing unit 67 ends the purchase processing.

When the number M of consumers staying in the purchase area 112 is not 0, the integrated processing unit 67 determines NO in ACT 542, and proceeds to ACT 544. The integrated processing unit 67 determines whether the number M of consumers staying in the purchase area 112 is 1 as ACT 544. When there is only one tracking file 68 in which the tracking location information of the movement data corresponding to the current time matches the purchase location information, the number M of consumers becomes one. Hereinafter, the tracking file 68 will be referred to as a target tracking file 68. For example, when there is only one consumer SA in the purchase area 112, the tracking file 680 becomes the target tracking file 680.

When the number M of consumers in the purchase area 112 is 1, the integrated processing unit 67 determines YES in ACT 544, and proceeds to ACT 545. The integrated processing unit 67 acquires the tracking location information of the movement data corresponding to the current time from the target tracking file 680 as ACT 545.

Figure 14:
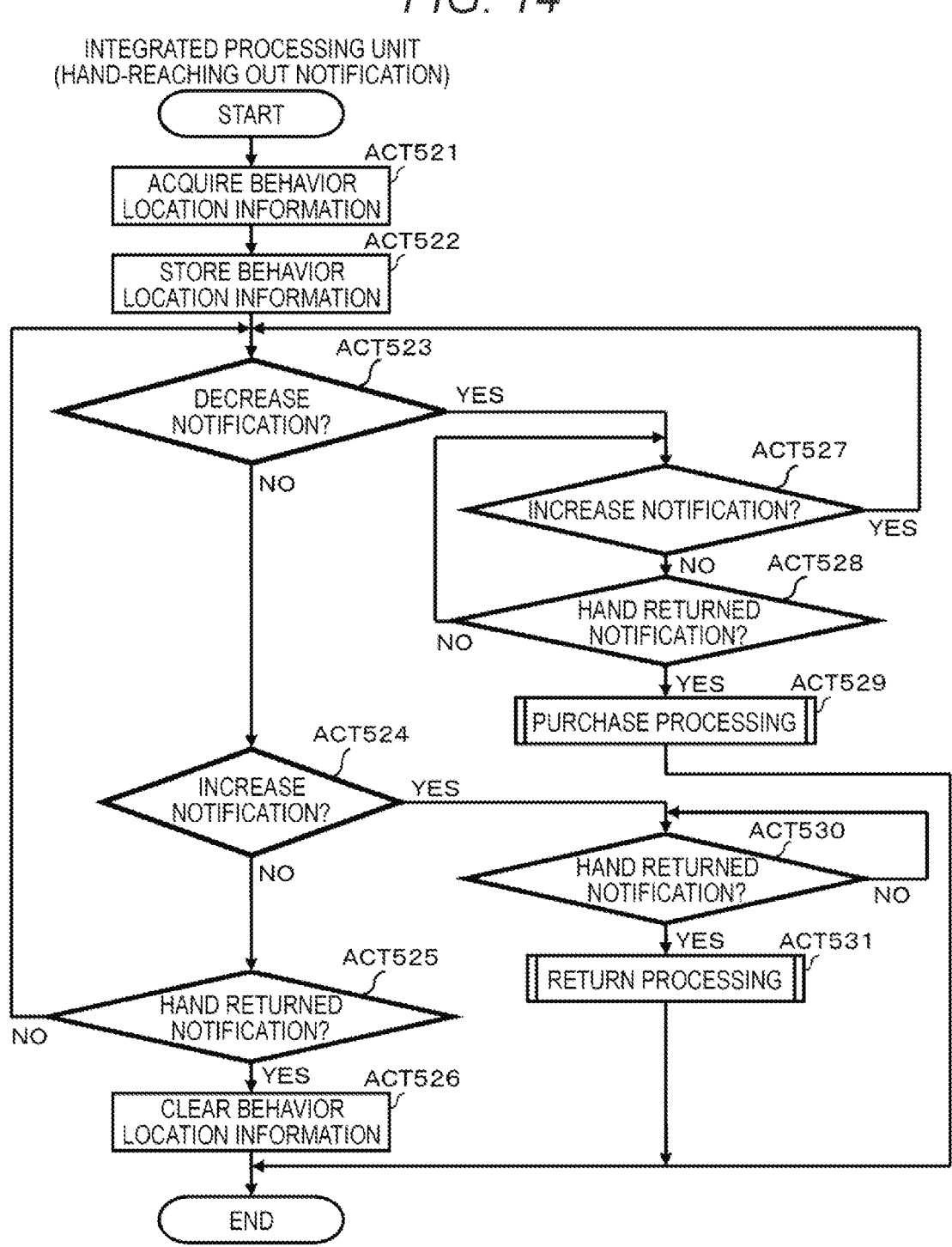
FIG. 14 is a flowchart illustrating an operation procedure of the integrated processing unit to which a hand reaching-out notification command is inputted.

As ACT 546, based upon the tracking location information and the behavior location information stored in the processing of ACT 522 in FIG. 14, the integrated processing unit 67 determines whether the purchase behavior by the consumer SA who is being tracked by the tracking ID described in the target tracking file 680 can be performed. Specifically, the integrated processing unit 67 determines whether the consumer SA at a location specified by the tracking location information could perform a behavior of reaching out the hand and taking the commodity from a location specified by the behavior location information. When the taking of the commodity cannot be performed, the integrated processing unit 67 determines that the purchase behavior cannot be performed. The integrated processing unit 67 determines NO in ACT 546, and proceeds to ACT 543. The integrated processing unit 67 outputs the voice data for the tracking error to the voice synthesizing unit 66 as ACT 543. Next, the integrated processing unit 67 ends the purchase processing.

When the purchase behavior can be performed, the integrated processing unit 67 determines YES in ACT 546, and proceeds to ACT 547. The integrated processing unit 67 acquires the tracking ID from the target tracking file 680 as ACT 547.

Next, the integrated processing unit 67 retrieves the correlation table 69 as ACT 548 and determines whether the tracking ID is correlated with the member ID. When the tracking ID is not correlated with the member ID, it can be assumed that a consumer whose member ID is not authenticated performs the purchase behavior. Here, the integrated processing unit 67 determines NO in ACT 548, and proceeds to ACT 549. The integrated processing unit 67 outputs voice data for an authentication error to the voice synthesizing unit 66 as ACT 549. Accordingly, the voice synthesizing unit 66 synthesizes a voice message indicating the authentication error. The speaker 5 outputs, for example, a voice message such as "the member ID is not authenticated". Next, the integrated processing unit 67 ends the purchase processing.

When the tracking ID is correlated with the member ID, the integrated processing unit 67 determines YES in ACT 548, and proceeds to ACT 550. The integrated processing unit 67 acquires the member ID correlated with the tracking ID as ACT 550. The integrated processing unit 67 acquires a sensor number from the decrease notification command as ACT 551. The decrease notification command is received from the commodity monitoring sensor 1 in ACT 523 of FIG. 14.

The integrated processing unit 67 reads the commodity data including the commodity code, the commodity name, and the unit weight stored together with the sensor number from the commodity data file 61 as ACT 552. The integrated processing unit 67 calculates the number of purchases as ACT 553. Specifically, the integrated processing unit 67 acquires a weight change amount from the decrease notification command. Next, the integrated processing unit 67 divides the weight change amount by the unit weight. As a result, when a value of a first decimal point is "1", the value is rounded down, and when the value thereof is "9", the value is rounded up, thereby calculating the number of purchases.

When the value of the first decimal point is "2" to "8", the number of purchases cannot be calculated. Therefore, when the value of the first decimal point is "1" or "2", the value is rounded down, and when the value thereof is "8" or "9", the value is rounded up, such that the number of purchases may be calculated. Alternatively, when the weight change amount cannot be divided by the unit weight, the number of purchases may not be calculated. Generally, each commodity is correctly displayed in the section of the shelf 10. Therefore, since the weight change amount can be divided by the unit weight, the number of purchases can be calculated.

The integrated processing unit 67 outputs the purchase notification command to the sales management apparatus 7 as ACT 554. The purchase notification command includes the member ID acquired in the processing of ACT 550, the commodity code, the commodity name, and the unit weight of the commodity data read in the processing of ACT 552, and the number of purchases calculated in the processing of ACT 553. Next, the integrated processing unit 67 ends the purchase processing.

On the other hand, when there exist two or more target tracking files 68, that is, when the number M of consumers staying in the purchase area 112 is two or more, the integrated processing unit 67 determines NO in ACT 544, and proceeds to ACT 555. The integrated processing unit 67 acquires the tracking location information of the movement data corresponding to the current time from all the target tracking files 68 as ACT 555.

As ACT 556, the integrated processing unit 67 counts the number N of consumers who can perform the purchase behavior based upon the tracking location information acquired from the target tracking file 68 and the behavior location information stored in the processing of ACT 522 of FIG. 14. Specifically, the integrated processing unit 67 determines, for each target tracking file 68, whether the consumer at a location specified by the tracking location information can perform a behavior of reaching out the hand and taking the commodity from a location specified by the behavior location information. Next, the integrated processing unit 67 counts the number of target tracking files 68 determined to be capable of performing the behavior of taking the commodity as the number N of consumers who can perform the purchase behavior.

The integrated processing unit 67 determines whether the number N of consumers who can perform the purchase behavior is 0 as ACT 557. When the number of persons N is 0, the integrated processing unit 67 determines YES in ACT 557, and proceeds to ACT 543. The integrated processing unit 67 executes the processing of ACT 543 in the same manner as described above. Next, the integrated processing unit 67 ends the purchase processing.

When the number N of consumers who can perform the purchase behavior is not 0, the integrated processing unit 67 determines NO in ACT 557, and proceeds to ACT 558. The integrated processing unit 67 determines whether the number N of consumers who can perform the purchase behavior is one as ACT 558. When the number N of persons is one, it can be specified that the one consumer performs the purchase behavior. The integrated processing unit 67 determines YES in ACT 558, and proceeds to ACT 547. The integrated processing unit 67 executes the processing of ACT 547 to ACT 554 in the same manner as described above. Next, the integrated processing unit 67 ends the purchase processing.

When the number N of consumers who can perform the purchase behavior is two or more, the purchaser cannot be specified. The integrated processing unit 67 determines NO in ACT 558, and proceeds to ACT 559. The integrated processing unit 67 outputs voice data for a purchase error to the voice synthesizing unit 66 as ACT 559. Accordingly, the voice synthesizing unit 66 synthesizes a voice message indicating the purchase error. The speaker 5 outputs, for example, a voice message such as "since the purchaser cannot be specified, an error occurred". Next, the integrated processing unit 67 ends the purchase processing.

As such, the integrated processing unit 67 specifies one consumer staying in the purchase area 112 as the purchaser of the commodity taken from the shelf 10 by executing the purchase processing with respect to the purchase behavior of the consumer. Next, the integrated processing unit 67 transmits, to the sales management apparatus 7, the purchase notification command including the member ID of the consumer specified as the purchaser and the purchased commodity data.

Next, an operation of the sales management apparatus 7 that receives the purchase notification command will be described with reference to FIG. 20.

The sales management apparatus 7 acquires the member ID from the purchase notification command as ACT 701. The sales management apparatus 7 generates the purchased commodity data based upon the data of the commodity included in the purchase notification command, that is, the commodity code, the commodity name, the unit price, and the number of purchases as ACT 702. Next, the sales management apparatus 7 sets a temporary registration flag of the purchased commodity data to "0" as ACT 703. The sales management apparatus 7 adds the purchased commodity data to the purchase list 71 in which the member ID acquired in the processing of ACT 701 is set as ACT 704. As described above, the sales management apparatus 7 ends the operation of the procedure illustrated in a flowchart of FIG. 20.

As described above, each time the sales management apparatus 7 receives the purchase notification command from the integrated processing unit 67, the sales management apparatus 7 adds the purchased commodity data to the purchase list 71 in which the member ID included in the purchase notification command is set. Here, the temporary registration flag of the purchased commodity data is "0".

Here, the integrated processing unit 67 that executes the purchase processing in cooperation with the tracking processing unit 62, the commodity monitoring processing unit 64, and the behavior monitoring processing unit 65 has a function as a recognition unit for recognizing the purchase behavior of the commodity by the consumer, a specification unit for specifying the consumer who performs the purchase behavior, and a purchase processing unit. That is, when the purchase behavior of the commodity is recognized and the consumer who performs the purchase behavior is specified, the integrated processing unit 67 outputs, to the sales management apparatus 7, the purchase notification command for adding the data of the commodity to the purchase list of the consumer.

Figure 16:
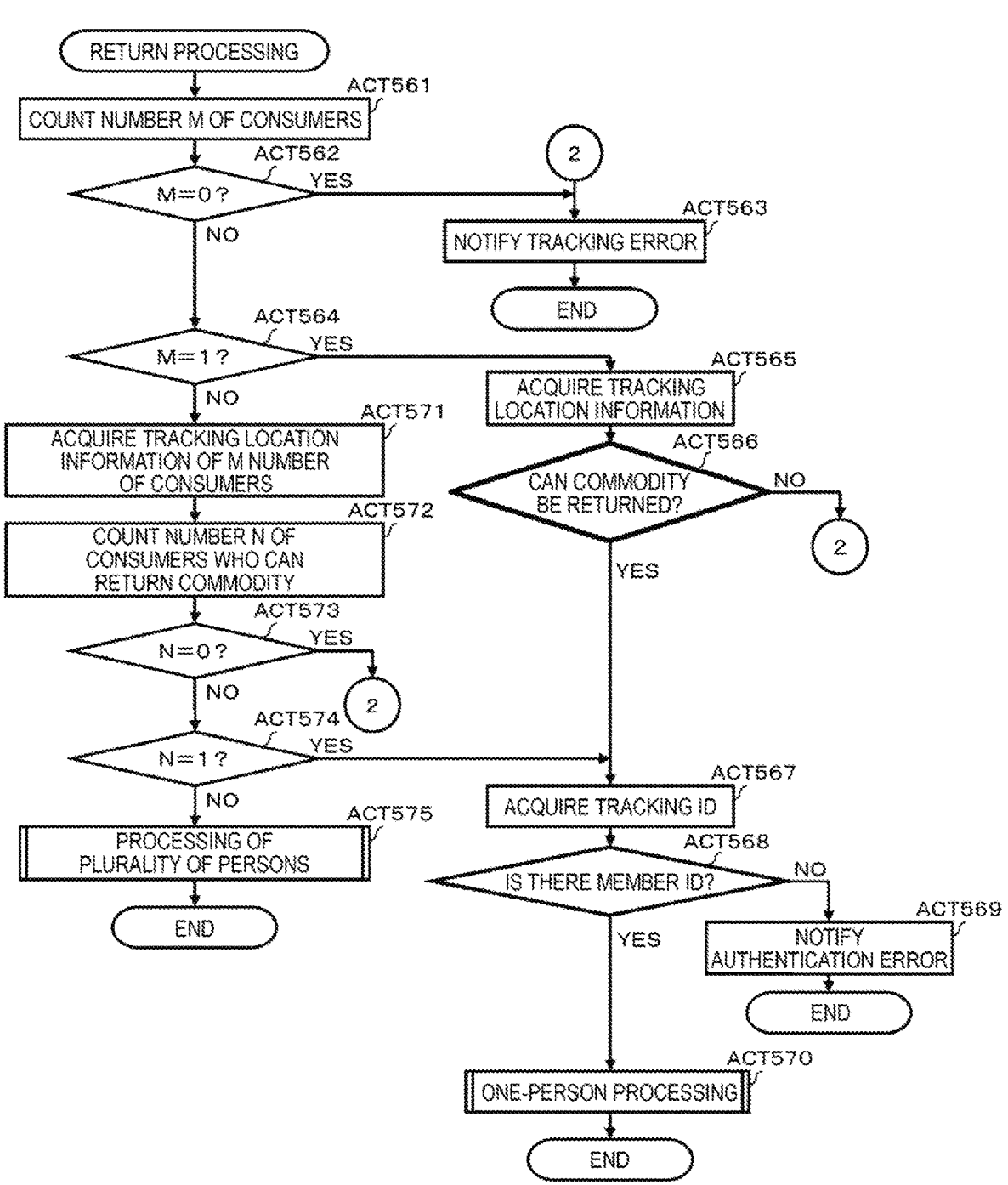
FIG. 16 is a flowchart illustrating a procedure of return processing.

FIG. 16 is a flowchart illustrating a procedure of a main part of the return processing. When the return processing is started, the integrated processing unit 67 counts the number M of consumers staying in the purchase area 112 as ACT 561. The integrated processing unit 67 counts the number M of consumers staying in the purchase area 112 in the same manner as the processing of ACT 541 of the purchase processing.

The integrated processing unit 67 determines whether the number M of consumers staying in the purchase area 112 is 0 as ACT 562. When the number of persons M is 0, the integrated processing unit 67 determines YES in ACT 562, and proceeds to ACT 563. The integrated processing unit 67 outputs voice data for a tracking error to the voice synthesizing unit 66 as ACT 563. Accordingly, the voice synthesizing unit 66 synthesizes a voice message indicating the tracking error. The speaker 5 outputs, for example, a voice message such as "an error occurred and shopping cannot be performed". Next, the integrated processing unit 67 ends the return processing.

When the number M of consumers staying in the purchase area 112 is not 0, the integrated processing unit 67 determines NO in ACT 562, and proceeds to ACT 564. The integrated processing unit 67 determines whether the number M of consumers staying in the purchase area 112 is 1 as ACT 564.

When the number M of consumers staying in the purchase area 112 is 1, the integrated processing unit 67 determines YES in ACT 564, and proceeds to ACT 565. The integrated processing unit 67 acquires the tracking location information of the movement data corresponding to the current time from the target tracking file 68 as ACT 565. As ACT 566, the integrated processing unit 67 determines whether the consumer being tracked by the tracking ID described in the target tracking file 68 can perform the return behavior, based upon the tracking location information and the behavior location information stored in the processing of ACT 522 of FIG. 14. Specifically, the integrated processing unit 67 determines whether the consumer at a location specified by the tracking location information can perform a behavior of reaching out the hand and returning the commodity from a location specified by the behavior location information. When the behavior of returning the commodity cannot be performed, the integrated processing unit 67 determines that the return behavior cannot be performed. In that case, the integrated processing unit 67 determines NO in ACT 566, and proceeds to ACT 563. The integrated processing unit 67 outputs the voice data for the tracking error to the voice synthesizing unit 66 as ACT 563. Next, the integrated processing unit 67 ends the return processing.

When the return behavior can be performed, the integrated processing unit 67 determines YES in ACT 566, and proceeds to ACT 567. The integrated processing unit 67 acquires a tracking ID from the target tracking file 68 as ACT 567. Next, the integrated processing unit 67 retrieves the correlation table 69 as ACT 568 and determines whether the tracking ID is correlated with the member ID. When the tracking ID is not correlated with the member ID, the integrated processing unit 67 outputs voice data for an authentication error to the voice synthesizing unit 66 as ACT 569. Accordingly, the voice synthesizing unit 66 synthesizes a voice message indicating the authentication error. The speaker 5 outputs, for example, a voice message such as "the member ID is not authenticated". Next, the integrated processing unit 67 ends the return processing.

When the tracking ID is correlated with the member ID, the integrated processing unit 67 determines YES in ACT 568, and proceeds to ACT 570. The integrated processing unit 67 executes one-person processing as ACT 570.

Figure 17:
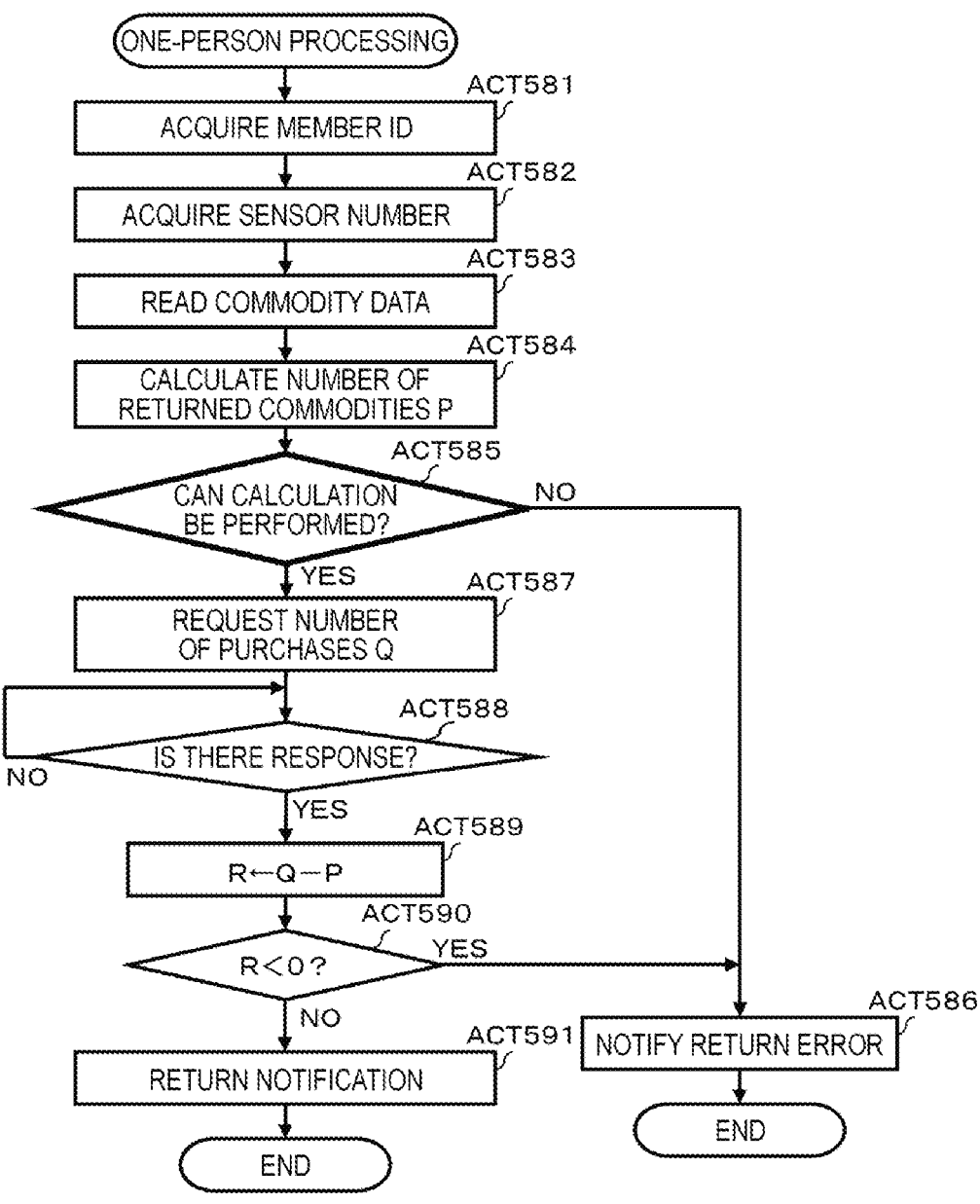
FIG. 17 is a flowchart illustrating a procedure of one-person processing.

FIG. 17 is a flowchart illustrating a procedure of a main part of the one-person processing.

The integrated processing unit 67 acquires the member ID correlated with the tracking ID as ACT 581. The integrated processing unit 67 acquires a sensor number from the increase notification command as ACT 582. The increase notification command is received from the commodity monitoring sensor 1 in ACT 524 of FIG. 14.

The integrated processing unit 67 reads the commodity data including the commodity code, the commodity name, and the unit weight stored together with the sensor number from the commodity data file 61 as ACT 583. The integrated processing unit 67 calculates the number of returned commodities P as ACT 584. Specifically, the integrated processing unit 67 acquires a weight change amount from the increase notification command. Next, the integrated processing unit 67 divides the weight change amount by the unit weight. As a result, when a value of a first decimal point is "1", the value is rounded down, and when the value thereof is "9", the value is rounded up, thereby calculating the number of returned commodities P.

When the value of the first decimal point is "2" to "8", the number of returned commodities P cannot be calculated. Therefore, when the value of the first decimal point is "1" or "2", the value is rounded down, and when the value thereof is "8" or "9", the value is rounded up, such that the number of returned commodities P may be calculated. Alternatively, when the weight change amount cannot be divided by the unit weight, the number of returned commodities P may not be calculated.

The integrated processing unit 67 determines whether the number of returned commodities P can be calculated as ACT 585. When the number of returned commodities P cannot be calculated, it is considered that the consumer returns the commodity to a section of another commodity having a different unit weight. For example, as illustrated in FIG. 4, when the commodity A having a unit weight of 500 grams is returned to the section 203 in which the commodity C is displayed, quotient becomes 0.83 because the unit weight of the commodity C is 600 grams. In the same manner, when the commodity A is returned to the section 205 in which the commodity E is displayed, quotient becomes 0.625 because the unit weight of the commodity E is 800 grams. Therefore, in either case, the number of returned commodities P cannot be calculated.

When the number of returned commodities P cannot be calculated, the integrated processing unit 67 determines NO in ACT 585, and proceeds to ACT 586. The integrated processing unit 67 outputs voice data for a return error to the voice synthesizing unit 66 as ACT 586. Accordingly, the voice synthesizing unit 66 synthesizes a voice message indicating the return error. The speaker 5 outputs, for example, a voice message such as "a place to which the commodity is returned is different". Next, the integrated processing unit 67 ends the one-person processing.

When the number of returned commodities P can be calculated, the integrated processing unit 67 determines YES in ACT 585, and proceeds to ACT 587. The integrated processing unit 67 outputs a request command for the number of purchases to the sales management apparatus 7 as ACT 587. The request command for the number of purchases includes the member ID acquired in the processing of ACT 581 and the commodity code of the commodity data acquired in the processing of ACT 583.

The sales management apparatus 7 that receives the request command for the number of purchases detects the number of purchases Q stored in correlation with the commodity code from the purchase list 71 in which the member ID is set, and responds to the integrated processing unit 67 with the detected number of purchases Q. Here, when the purchase list 71 does not store the data of the commodity code, the sales management apparatus 7 responds thereto with "0" as the number of purchases Q.

The integrated processing unit 67 that outputs the request command for the number of purchases waits for the response of the number of purchases Q as ACT 588. When the number of purchases Q is received, the integrated processing unit 67 calculates a difference value R by subtracting the number of returned commodities P from the number of purchases Q as ACT 589. The integrated processing unit 67 determines whether the difference value R is negative as ACT 590.

For example, it can be assumed that the consumer SA takes out the commodity A from the shelf 10 but does not take out the commodity B if the purchase list 711 of the consumer SA stores the data of the commodity A (the number of purchases=1), but does not store the data of the commodity B. Here, it can be assumed that the consumer SA mistakenly returns the commodity A to the section 202 of the commodity B. Since the unit weights of the commodity A and the commodity B are equal to each other, the number of returned commodities P is calculated as "1". However, since the purchase list 711 does not store the data of the commodity B, the number of purchases Q is "0". Therefore, the difference value R becomes "−1". However, when the consumer SA returns the commodity A to the section 201, the difference value R becomes "0" because the number of purchases Q is "1".

When the difference value R is negative, the integrated processing unit 67 determines YES in ACT 590, and proceeds to ACT 586. The integrated processing unit 67 outputs the voice data for the return error to the voice synthesizing unit 66. Next, the integrated processing unit 67 ends the one-person processing.

When the difference value R is "0" or "1" or more, the integrated processing unit 67 determines NO in ACT 590, and proceeds to ACT 591. The integrated processing unit 67 outputs the return notification command to the sales management apparatus 7 as ACT 591. The return notification command includes the member ID acquired in the processing of ACT 581, the commodity code, the commodity name, and the unit weight of the commodity data read in the processing of ACT 583, and the number of returned commodities P calculated in the processing of ACT 584. Next, the integrated processing unit 67 ends the one-person processing.

Referring back to the description of FIG. 16, when the number M of consumers staying in the purchase area 112 is two or more, the integrated processing unit 67 determines NO in ACT 564, and proceeds to ACT 571. The integrated processing unit 67 acquires the tracking location information of the movement data corresponding to the current time from all the target tracking files 68 as ACT 571. As ACT 572, the integrated processing unit 67 counts the number N of consumers who can perform the return behavior based upon the tracking location information acquired from the target tracking file 68 and the behavior location information stored in ACT 522 of FIG. 14.

The integrated processing unit 67 determines whether the number N of consumers who can perform the return behavior is 0 as ACT 573. When the number of persons N is 0, the integrated processing unit 67 determines YES in ACT 573, and proceeds to ACT 563. The integrated processing unit 67 outputs the voice data for the tracking error to the voice synthesizing unit 66 as ACT 563. Next, the integrated processing unit 67 ends the return processing.

When the number N of consumers who can perform the return behavior is not 0, the integrated processing unit 67 determines NO in ACT 573, and proceeds to ACT 574. The integrated processing unit 67 determines whether the number N of consumers who can perform the return behavior is one as ACT 574. When the number of persons N is one, the one consumer can be specified as a person returning the commodity. The integrated processing unit 67 determines YES in ACT 574, and proceeds to ACT 567. Next, the integrated processing unit 67 executes the processing of ACT 567 to ACT 570 in the same manner as described above.

When the number N of consumers who can perform the return behavior is two or more, the person returning the commodity cannot be specified. The integrated processing unit 67 determines NO in ACT 574, and proceeds to ACT 575. The integrated processing unit 67 executes processing of a plurality of persons as ACT 575.

Figure 18:
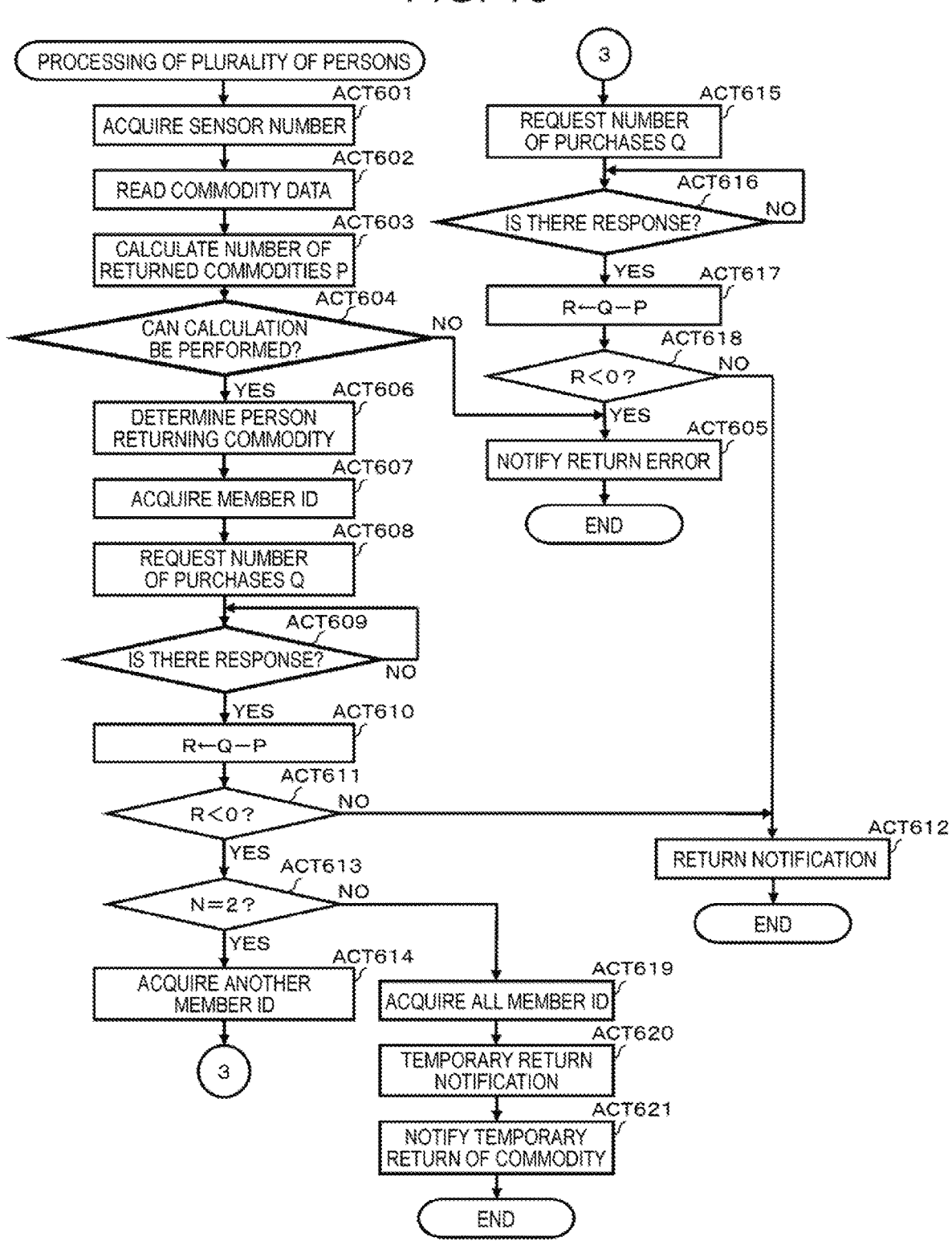
FIG. 18 is a flowchart illustrating a procedure of processing of a plurality of people.

FIG. 18 is a flowchart illustrating a procedure of a main part of processing of the plurality of persons.

The integrated processing unit 67 acquires a sensor number from the return notification command as ACT 601. Next, the integrated processing unit 67 reads the commodity data including the commodity code, the commodity name, and the unit weight stored together with the sensor number from the commodity data file 61 as ACT 602. The integrated processing unit 67 calculates the number of returned commodities P as ACT 603. The integrated processing unit 67 calculates the number of returned commodities P in the same manner as the processing of ACT 584 of the one-person processing.

The integrated processing unit 67 determines whether the number of returned commodities P can be calculated as ACT 604. When the number of returned commodities P cannot be calculated, the integrated processing unit 67 determines NO in ACT 604, and proceeds to ACT 605. The integrated processing unit 67 outputs voice data for a return error as ACT 605 to the voice synthesizing unit 66. Accordingly, the voice synthesizing unit 66 synthesizes a voice message indicating the return error. The speaker 5 outputs, for example, a voice message such as "a place to which the commodity is returned is different". Next, the integrated processing unit 67 ends the processing of the plurality of persons.

When the number of returned commodities P can be calculated, the integrated processing unit 67 determines YES in ACT 604, and proceeds to ACT 606. The integrated processing unit 67 determines one of the consumers N who can perform the return behavior in the purchase area 112 as a person returning the commodity as ACT 606. For example, the integrated processing unit 67 determines a consumer whose tracking location information is closest to a location of coordinates specified by the behavior location information as the person returning the commodity. The integrated processing unit 67 acquires a member ID correlated with a tracking ID of the person returning the commodity as ACT 607.

The integrated processing unit 67 outputs a request command for the number of purchases to the sales management apparatus 7 as ACT 608. The request command for the number of purchases includes the member ID acquired in the processing of ACT 607 and the commodity code of the commodity data acquired in the processing of ACT 602.

As described above, the sales management apparatus 7 receiving the request command for the number of purchases detects the number of purchases Q stored in correlation with the commodity code from the purchase list 71 in which the member ID is set, and responds to the integrated processing unit 67 with the detected number of purchases Q.

The integrated processing unit 67 waits for the response of the number of purchases Q as ACT 609. When the number of purchases Q is received, the integrated processing unit 67 calculates the difference value R by subtracting the number of returned commodities P from the number of purchases Q as ACT 610. The integrated processing unit 67 determines whether the difference value R is negative as ACT 611. When the difference value R is "0" or "1" or more, the integrated processing unit 67 determines NO in ACT 611, and proceeds to ACT 612. The integrated processing unit 67 outputs the return notification command to the sales management apparatus 7 as ACT 612. Next, the integrated processing unit 67 ends the processing of the plurality of persons.

When the difference value R is negative, the integrated processing unit 67 determines YES in ACT 611, and proceeds to ACT 613. The integrated processing unit 67 determines whether the number N of consumers who can perform the return behavior is two as ACT 613. When the number of persons N is 2, the integrated processing unit 67 determines YES in ACT 613, and proceeds to ACT 614.

When the difference value R is negative, the consumer determined as the person returning the commodity in the processing of ACT 606 is not the person returning the commodity. Therefore, when there are two candidates for the person returning the commodity, the other person is determined as the person returning the commodity. That is, the integrated processing unit 67 acquires a member ID correlated with a tracking ID of the other consumer as ACT 614. Next, the integrated processing unit 67 outputs the request command for the number of purchases to the sales management apparatus 7 as ACT 615. The request command for the number of purchases includes the member ID acquired in the processing of ACT 614 and the commodity code of the commodity data acquired in the processing of ACT 602.

As described above, the sales management apparatus 7 receiving the request command for the number of purchases detects the number of purchases Q stored in correlation with the commodity code from the purchase list 71 in which the member ID is set, and responds to the integrated processing unit 67.

The integrated processing unit 67 waits for a response of the number of purchases Q as ACT 616. When the number of purchases Q is received, the integrated processing unit 67 calculates the difference value R by subtracting the number of returned commodities P from the number of purchases Q as ACT 617. The integrated processing unit 67 determines whether the difference value R is negative as ACT 618. When the difference value R is "0" or "1" or more, the integrated processing unit 67 determines NO in ACT 618, and proceeds to ACT 612. The integrated processing unit 67 outputs the return notification command to the sales management apparatus 7 as ACT 612. Next, the integrated processing unit 67 ends the processing of the plurality of persons.

When the difference value R is negative, the integrated processing unit 67 determines YES in ACT 618, and proceeds to ACT 605. The integrated processing unit 67 outputs the voice data for the return error to the voice synthesizing unit 66 as ACT 605. Next, the integrated processing unit 67 ends the processing of the plurality of persons.

When the number N of consumers who can perform the return behavior is three or more, the person returning the commodity cannot be specified. The integrated processing unit 67 determines NO in ACT 613, and proceeds to ACT 619. The integrated processing unit 67 acquires member IDs of all the consumers who can perform the return behavior as ACT 619. Next, the integrated processing unit 67 outputs a temporary return notification command to the sales management apparatus 7 as ACT 620. The temporary return notification command includes all the member IDs acquired in the processing of ACT 619, the commodity code, the commodity name, and the unit weight of the commodity data read in the processing of ACT 602, and the number of returned commodities P calculated in the processing of ACT 603.

The integrated processing unit 67 outputs voice data indicating that commodity returning registration is performed as temporary registration to the voice synthesizing unit 66 as ACT 621. Accordingly, the voice synthesizing unit 66 synthesizes the voice data indicating that the commodity returning registration is performed as the temporary registration. The speaker 5 outputs, for example, a voice message such as "data of the returned commodity is temporarily registered. Please tell the clerk". Next, the integrated processing unit 67 ends the processing of the plurality of persons.

As such, when the one-person processing or the processing of the plurality of persons is ended, the integrated processing unit 67 ends the return processing.

As such, the integrated processing unit 67 executes the return processing with respect to the return behavior of the consumer, thereby specifying one consumer staying in the purchase area 112 as the person returning the commodity who returns the commodity to the shelf 10. Next, the integrated processing unit 67 determines whether the consumer specified as the person returning the commodity purchases the commodity returned to the shelf, that is, the returned commodity. When the consumer purchases the returned commodity, that is, when the difference value R obtained by subtracting the number of returned commodities P from the number of purchases Q is 0 or more, the integrated processing unit 67 transmits, to the sales management apparatus 7, the return notification command including the member ID of the consumer specified as the person returning the commodity and the data of the returned commodity.

On the other hand, when the consumer does not purchase the returned commodity, that is, when the difference value R obtained by subtracting the number of returned commodities P from the number of purchases Q becomes negative, the integrated processing unit 67 notifies the return error.

When there are two consumers staying in the purchase area 112 and it is determined that a first consumer, who is a first person, does not purchase the returned commodity, it is determined whether a second consumer, who is another person, purchases the returned commodity. Next, when the second consumer purchases the returned commodity, that is, when the difference value R obtained by subtracting the number of returned commodities P from the number of purchases Q is 0 or more, the integrated processing unit 67 transmits, to the sales management apparatus 7, the return notification command including the member ID of the second consumer and the data of the returned commodity.

On the other hand, when the second consumer also does not purchase the returned commodity, that is, when the difference value R obtained by subtracting the number of returned commodities P from the number of purchases Q becomes negative, the integrated processing unit 67 notifies the return error.

When there are three or more consumers in the purchase area 112, the integrated processing unit 67 transmits, to the sales management apparatus 7, the temporary return notification command including the member ID of each consumer and the data of the returned commodity.

Next, an operation of the sales management apparatus 7 that receives the return notification command or the temporary return notification command will be described with reference to FIGS. 21 and 22.

FIG. 21 is a flowchart illustrating an operation procedure of the sales management apparatus 7 that receives the return notification command. The sales management apparatus 7 acquires the member ID from the return notification command as ACT 711. The sales management apparatus 7 generates the data of the returned commodity based upon the commodity data included in the return notification command, that is, the commodity code, the commodity name, the unit price, and the number of returned commodities P as ACT 712. The data of the returned commodity is obtained by replacing the number of purchases of the purchased commodity data with the number of returned commodities P.

As ACT 713, the sales management apparatus 7 selects the purchased commodity data whose commodity code matches the returned commodity data from the purchase list 71 in which the member ID acquired in the processing of ACT 701 is set. Next, as ACT 714, the sales management apparatus 7 subtracts the number of returned commodities P of the returned commodity data from the number of purchases of the selected purchased commodity data. As described above, the sales management apparatus 7 ends the operation of the procedure illustrated in the flowchart of FIG. 21.

As such, when the sales management apparatus 7 receives the return notification command from the integrated processing unit 67, the number of purchases of the purchased commodity data related to the returned commodity of the purchase list 71 in which the member ID included in the return notification command is set is subtracted by the number of returned commodities P. Here, the temporary registration flag of the purchased commodity data after the number of purchases is subtracted is "0".

Figure 22:
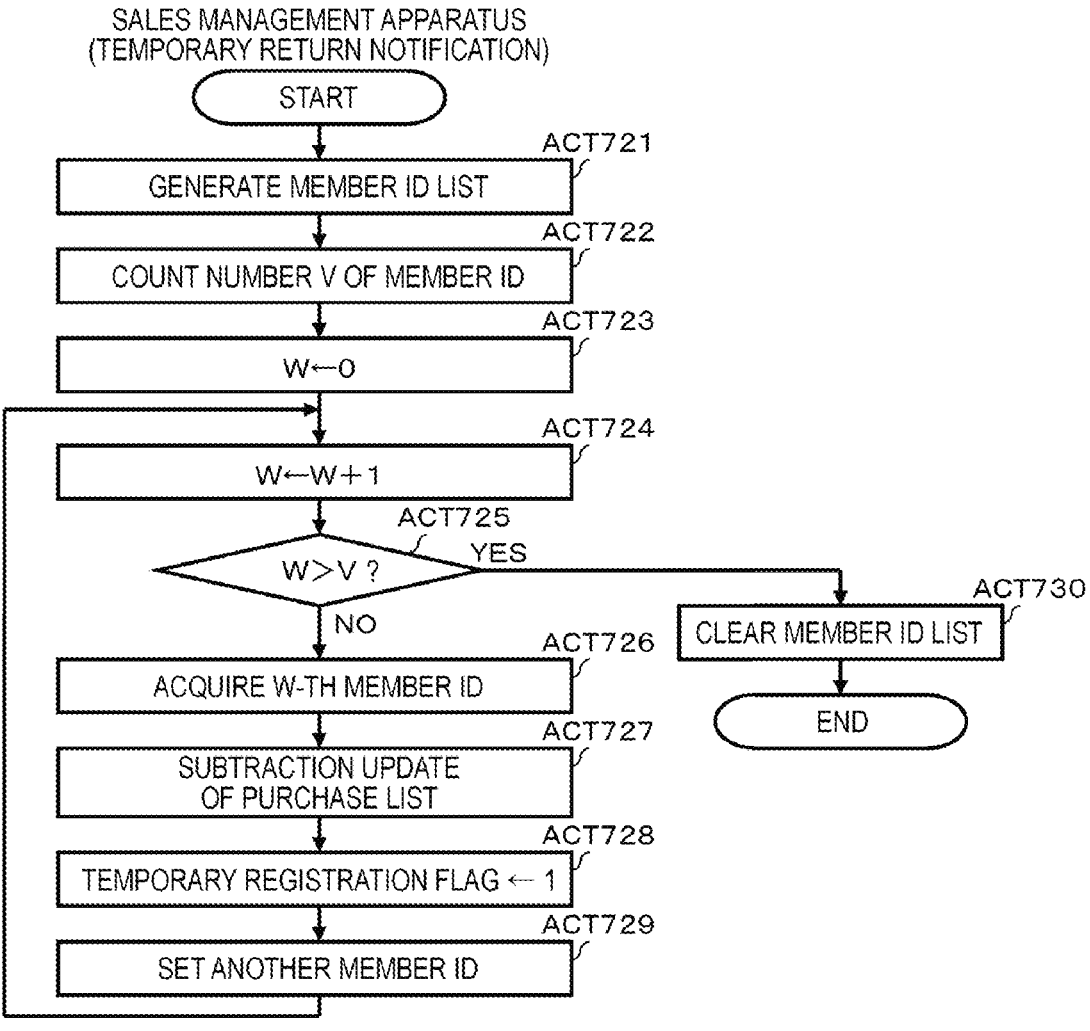
FIG. 22 is a flowchart illustrating an operation procedure of the sales management apparatus to which a temporary return notification command is inputted.

FIG. 22 is a flowchart illustrating an operation procedure of the sales management apparatus 7 that receives a temporary registration notification command. The sales management apparatus 7 generates a list of member IDs included in the temporary registration notification command as ACT 721. Hereinafter, the list is referred to as a member ID list. The sales management apparatus 7 counts the number V of member IDs included in the member ID list as ACT 722. The sales management apparatus 7 resets an addition counter W to "0" as ACT 723. Next, the sales management apparatus 7 counts up the addition counter W by "1" as ACT 724. Next, the sales management apparatus 7 determines whether the addition counter W exceeds the number V as ACT 725.

When the addition counter W does not exceed the number V, the sales management apparatus 7 acquires the W-th member ID from the member ID list as ACT 726. The W-th "W" is a value of the addition counter W. The sales management apparatus 7 subtracts the commodity data included in the temporary return notification command from the purchase list 71 in which the W-th member ID is set. Specifically, when purchased commodity data of a commodity code included in the temporary return notification command exits in the purchase list 71, the sales management apparatus 7 subtracts the number of purchases of the purchased commodity data by the number of returned commodities P included in the temporary return notification command. When the purchased commodity data of the commodity code does not exist in the purchase list 71, the sales management apparatus 7 generates the purchased commodity data based upon the commodity code, the commodity name, the unit price, and the number of returned commodities P included in the purchase notification command. Here, the number of returned commodities P is included in the purchased commodity data as the negative number of purchases. The sales management apparatus 7 adds the purchased commodity data to the purchase list 71.

As ACT 728, the sales management apparatus 7 sets the temporary registration flag of the purchased commodity data obtained by subtracting the number of returned commodities P from the number of purchases or the purchased commodity data including the negative number of purchases to "1". The sales management apparatus 7 sets a member ID of another person registered in the member ID list in another member ID area of the purchased commodity data as ACT 729.

After that, the sales management apparatus 7 returns to the processing of ACT 724. The sales management apparatus 7 further counts up the addition counter W by "1". When it is determined that the addition counter W does not exceed the number V, the sales management apparatus 7 executes the processing of ACT 726 to ACT 729 again.

As such, the sales management apparatus 7 repeatedly executes the processing of ACT 724 to ACT 729 until the addition counter W exceeds the number V. When the addition counter W exceeds the number V, the sales management apparatus 7 determines YES in ACT 725 and proceeds to ACT 730. The sales management apparatus 7 clears the member ID list. As described above, the sales management apparatus 7 ends the reception processing of the temporary return notification command.

As described above, when the sales management apparatus 7 receives the temporary registration notification command from the integrated processing unit 67, the data of the returned commodity is subtracted from each purchase list 71 in which all the member IDs included in the temporary registration notification command are set. With respect to the purchased commodity data in which the data of the returned commodity is subtracted, the temporary registration flag becomes "1".

Here, the integrated processing unit 67 that executes the return processing in cooperation with the tracking processing unit 62, the commodity monitoring processing unit 64, and the behavior monitoring processing unit 65 has a function of a recognition unit for recognizing a return behavior of a commodity by a consumer, a specification unit for specifying the consumer who performs the return behavior, a return processing unit, and an abnormal time processing unit. That is, when the return behavior of the commodity is recognized and the consumer who performs the return behavior is specified, the integrated processing unit 67 outputs the return notification command for subtracting the data of the commodity from the purchase list 71 of the consumer to the sales management apparatus 7. However, when the data of the purchase list 71 becomes an abnormal value by subtracting the data of the commodity from the purchase list 71, the integrated processing unit 67 does not output the return notification command. The integrated processing unit 67 executes abnormal time processing.

Specifically, when the difference value R between the number of purchases Q and the number of returned commodities P is negative, that is, the number of purchases after subtracting the number of returned commodities P becomes negative, the data in the purchase list 71 becomes the abnormal value. When determining YES in ACT 590 of the one-person processing, the integrated processing unit 67 executes the processing of ACT 586. That is, when the second consumer who performs the return behavior other than the first consumer specified by the specification unit is not specified, the integrated processing unit 67 executes processing of notifying a mistake of a return location as the abnormal time processing.

When determining YES in ACT 611 of the processing of the plurality of persons and further determining YES in ACT 613, the integrated processing unit 67 executes the processing of ACT 614 to ACT 618. Then, when determining NO in ACT 618, the integrated processing unit 67 executes the processing of ACT 612. That is, when only one second consumer is specified, the integrated processing unit 67 determines whether the data of the purchase list 71 becomes the abnormal value by subtracting the data of the commodity from the purchase list 71 of the second consumer. When the value does not become the abnormal value, the integrated processing unit 67 executes the processing of subtracting the data of the commodity from the purchase list of the second consumer as the abnormal time processing.

When determining NO in ACT 613 of the processing of the plurality of persons, the integrated processing unit 67 executes the processing of ACT 619 to ACT 621. That is, when a plurality of second consumers are specified, the integrated processing unit 67 executes processing of subtracting the data of the commodity from the purchase list 71 of each second consumer in cooperation with the sales management apparatus 7, and of indicating that the subtracted data is temporary data as the abnormal time processing.

Next, an operation of the integrated processing unit 67 to which the exit notification command is inputted will be described with reference to a flowchart of FIG. 19.

The integrated processing unit 67 acquires a tracking ID from the exit notification command as ACT 631. The integrated processing unit 67 retrieves the correlation table 69 and determines whether the tracking ID is correlated with a member ID as ACT 632. When the member ID is not correlated therewith, a consumer managed by the tracking ID is a consumer who exits the store without performing the personal authentication. Therefore, the integrated processing unit 67 determines NO in ACT 632, and ends the processing.

When the member ID is correlated with the tracking ID, the integrated processing unit 67 determines YES in ACT 632, and proceeds to ACT 633. The integrated processing unit 67 acquires the member ID correlated with the tracking ID as ACT 633. Next, the integrated processing unit 67 requests the sales management apparatus 7 to confirm the purchase list 71 in which the member ID is set as ACT 634.

In response to the confirmation request, the sales management apparatus 7 determines whether there is purchased commodity data in which the temporary registration flag is set to "1" in the purchase list 71 in which the member ID is set. Hereinafter, the purchased commodity data in which the temporary registration flag is set to "1" is referred to as temporary purchased commodity data. Next, the sales management apparatus 7 responds to the integrated processing unit 67 with a confirmation result.

The integrated processing unit 67 determines whether the temporary purchased commodity data exists in the purchase list 71 in which the member ID is set as ACT 635. When the temporary purchased commodity data does not exist, the integrated processing unit 67 determines NO in ACT 635, and proceeds to ACT 636. The integrated processing unit 67 outputs a settlement permission notification command to the sales management apparatus 7 as ACT 636. The settlement permission notification command includes the member ID acquired in the processing of ACT 633.

On the other hand, when the temporary purchased commodity data exists, the integrated processing unit 67 determines YES in ACT 635, and proceeds to ACT 637. The integrated processing unit 67 outputs a settlement confirmation notification command to the sales management apparatus 7 as ACT 637. The settlement confirmation notification command includes the member ID acquired in the processing of ACT 633.

When outputting the settlement permission notification command or the settlement confirmation notification command, the integrated processing unit 67 ends the operation of the procedure illustrated in the flowchart of FIG. 19.

As such, when the exit notification command is inputted, the integrated processing unit 67 determines that there is a settlement instruction. Next, the integrated processing unit 67 outputs a settlement permission notification to the sales management apparatus 7, with respect to a consumer whose purchased commodity data whose temporary registration flag is "1" is not registered in the purchase list 71. On the other hand, the integrated processing unit 67 outputs a settlement confirmation notification to the sales management apparatus 7, with respect to a consumer whose purchased commodity data whose temporary registration flag is "1" is registered in the purchase list 71.

Figure 23:
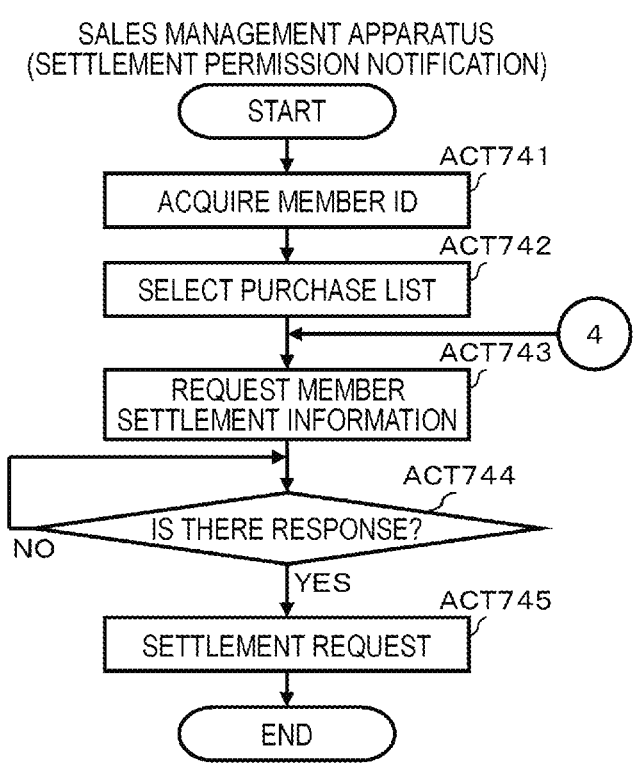
FIG. 23 is a flowchart illustrating an operation procedure of the sales management apparatus to which a settlement permission notification command is inputted.

FIG. 23 is a flowchart illustrating an operation of the sales management apparatus 7 that receives the settlement permission notification command. The sales management apparatus 7 acquires a member ID from the settlement permission notification command as ACT 741. The sales management apparatus 7 selects the purchase list 71 in which the member ID is set as ACT 742. The sales management apparatus 7 requests information related to settlement registered by a consumer to be identified by the member ID from the member server 8 as ACT 743.

In response to the request, the member server 8 retrieves the member database 81, acquires the information related to the settlement registered by the consumer, and responds to the sales management apparatus 7.

The sales management apparatus 7 waits for a response of the information related to the settlement as ACT 744. When there is the response of the information related to the settlement from the member server 8, the sales management apparatus 7 determines YES in ACT 744, and proceeds to ACT 745. As ACT 745, the sales management apparatus 7 outputs the purchased commodity data registered in the purchase list 71 to the settlement server 9 together with the information related to the settlement, and requests settlement. In response to the request, the settlement server 9 executes settlement processing. For example, when the information related to the settlement is information related to card settlement of a credit card, the settlement processing of the credit card is executed. For example, when the information related to the settlement is information necessary for electronic settlement using a barcode and a two-dimensional code, settlement processing by the electronic settlement is executed. As described above, the sales management apparatus 7 ends the processing with respect to the settlement permission notification command.

Figure 24:
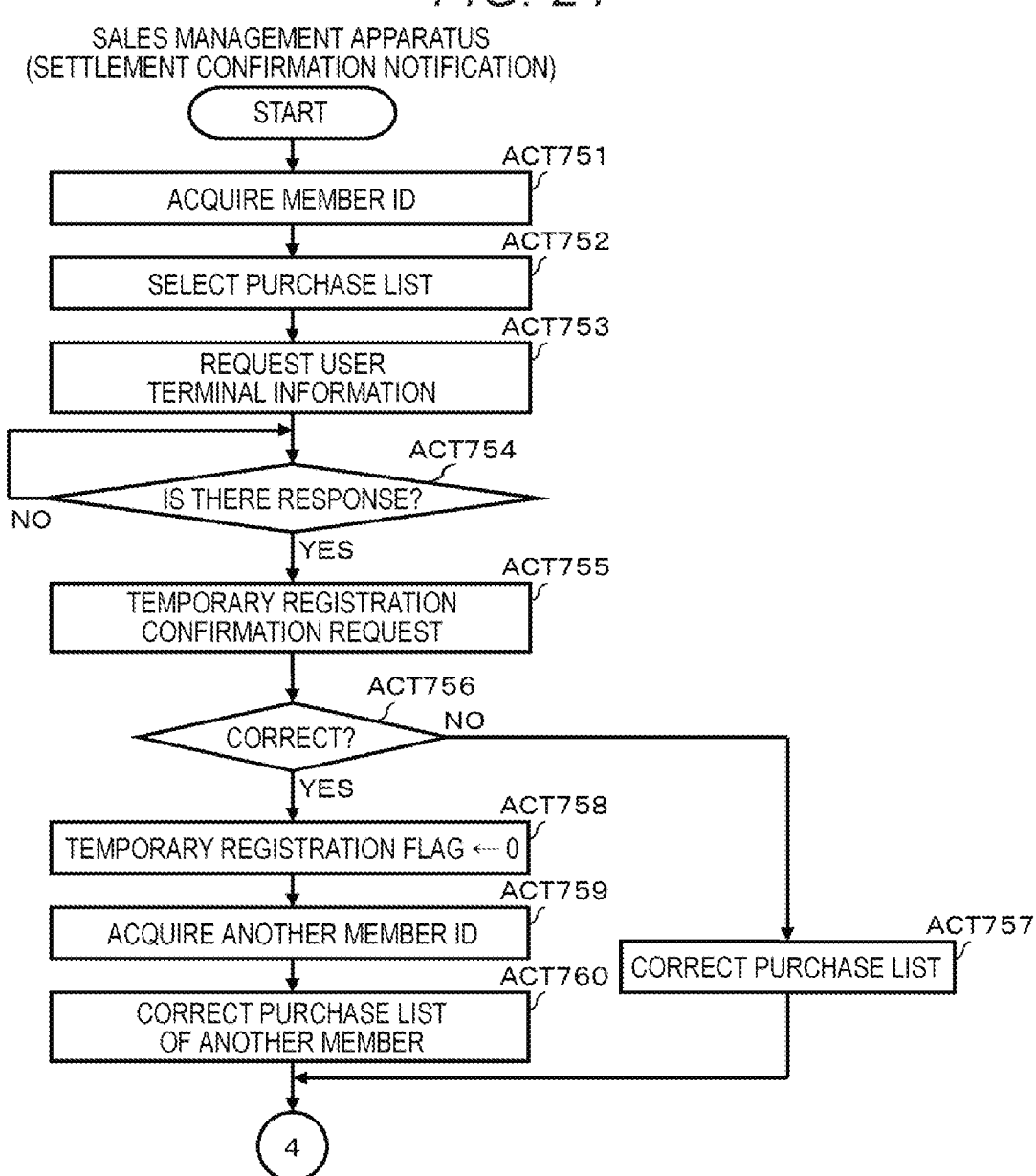
FIG. 24 is a flowchart illustrating an operation procedure of the sales management apparatus to which a settlement confirmation notification command is inputted.

FIG. 24 is a flowchart illustrating an operation of the sales management apparatus 7 that receives the settlement confirmation notification command. The sales management apparatus 7 acquires a member ID from the settlement confirmation notification command as ACT 751. The sales management apparatus 7 selects the purchase list 71 in which the member ID is set as ACT 752. The sales management apparatus 7 requests information related to the user terminal TM of a consumer to be identified by the member ID from the member server 8 as ACT 753.

In response to the request, the member server 8 retrieves the member database 81, acquires terminal information registered by the consumer, and responds to the sales management apparatus 7.

The sales management apparatus 7 waits for a response of the terminal information as ACT 754. When there is the response of the terminal information from the member server 8, the sales management apparatus 7 determines YES in ACT 754, and proceeds to ACT 755. As ACT 755, the sales management apparatus 7 communicates with the user terminal TM to be specified by the terminal information, and requests confirmation of the number of purchases of the temporary purchased commodity data.

In response to the confirmation request, the commodity name and the number of purchases of the temporary purchased commodity data are displayed on a touch panel of the user terminal TM. The consumer determines whether he or she purchases the displayed commodity by the number of purchases. When purchasing the displayed commodity by the number of purchases, the consumer performs an operation for notifying the sales management apparatus 7 that the number of purchases is correct. When the displayed commodity is not purchased by the consumer or when the number of purchases is different, the consumer corrects the number of purchases. That is, when not purchasing the displayed commodity, the consumer sets the number of purchases to "0". When the number of purchases is incorrect, the consumer corrects the incorrect number of purchases to the correct number of purchases.

As ACT 756, the sales management apparatus 7 waits for a notification indicating that the number of purchases is correct or waits for the number of purchases to be corrected. When the number of purchases is corrected, the sales management apparatus 7 determines NO in ACT 756, and proceeds to ACT 757. The sales management apparatus 7 corrects the purchase list 71 as ACT 757. Specifically, the sales management apparatus 7 changes the number of purchases of the corresponding purchased commodity data to the corrected number of purchases, and sets the temporary registration flag to "0". Thereafter, the sales management apparatus 7 proceeds to the processing of ACT 743 in FIG. 23. Next, the sales management apparatus 7 executes the processing of ACT 743 to ACT 745 in the same manner as described above.

When there is the notification indicating that the number of purchases is correct, the sales management apparatus 7 determines YES in ACT 756, and proceeds to ACT 758. The sales management apparatus 7 sets the temporary registration flag of the corresponding purchased commodity data to "0" as ACT 758. The sales management apparatus 7 acquires another member ID of the corresponding purchased commodity data as ACT 759. The sales management apparatus 7 corrects the purchase list 71 in which the another member ID is set as ACT 760. Specifically, the sales management apparatus 7 returns the purchased commodity data whose temporary registration flag is "1" registered in the purchase list 71 of the another member to a state before the temporary registration flag is set to "1". Next, the sales management apparatus 7 sets the temporary registration flag to "0". Thereafter, the sales management apparatus 7 proceeds to the processing of ACT 743 in FIG. 23. The sales management apparatus 7 executes the processing of ACT 743 to ACT 745 in the same manner as described above.

Here, the integrated processing unit 67 has a function as a settlement control unit in cooperation with the sales management apparatus 7. That is, the integrated processing unit 67 determines, to the sales management apparatus 7, whether the temporary purchased commodity data exists in the purchase list 71 of the consumer in response to the settlement instruction. When the data shown as the temporary data, that is, the temporary purchased commodity data does not exist, the integrated processing unit 67 outputs the settlement permission notification to the sales management apparatus 7. Accordingly, the data of the purchase list is transmitted from the sales management apparatus 7 to the settlement server 9, and the settlement processing is executed.

On the other hand, when the temporary purchased commodity data exists, the integrated processing unit 67 outputs the settlement confirmation notification to the sales management apparatus 7. Accordingly, the sales management apparatus 7 executes processing of causing the consumer to confirm the number of purchases of the temporary purchased commodity data. When the confirmation of the number of purchases is completed, the data of the purchase list is transmitted from the sales management apparatus 7 to the settlement server 9, and the settlement processing is executed.

As described above, the operation description of the store system 100 is finished.

The store system 100 of the embodiment can provide the following operational effects.

First, when the consumer SA returns the commodity A to the shelf 10, it can be assumed that the consumer SA mistakenly returns the commodity A to the section 203 of the commodity C having a different unit weight. Here, the integrated processing unit 67 determines NO in ACT 585 of the one-person processing illustrated in FIG. 17. Alternatively, the integrated processing unit 67 determines NO in ACT 604 of the processing of the plurality of persons illustrated in FIG. 18. As a result, the speaker 5 outputs, for example, the voice message such as "a place to which the commodity is returned is different". Generally, it is possible to easily identify a mistake of returning a commodity to a section of another commodity having a different unit weight.

Next, it can be assumed that the consumer SA returns the commodity A to the section 202 of the commodity B having the same unit weight, the processing is divided by the number of consumers who can perform the return behavior in the purchase area 112. When the number of persons is one, the integrated processing unit 67 executes the processing of ACT 587 to ACT 590 of the one-person processing illustrated in FIG. 17. Here, when it can be assumed that the consumer SA does not purchase the commodity B, the difference value R calculated in ACT 589 becomes negative. As a result, the integrated processing unit 67 determines YES in ACT 590, and the speaker 5 outputs, for example, a voice message saying as "a place to which the commodity is returned is different". Therefore, it is possible to easily identify a mistake of returning a commodity to a section of another commodity having the same unit weight.

On the other hand, when there is the consumer SB in addition to the consumer SA as a consumer who can perform the return behavior, the integrated processing unit 67 executes the processing of ACT 606 to ACT 618 of the processing of the plurality of persons illustrated in FIG. 18. Here, when it can be assumed that neither consumer SA nor consumer SB purchases the commodity B, the difference values R calculated in ACT 610 and ACT 618 are both negative. As a result, the integrated processing unit 67 determines YES in ACT 618, and the speaker 5 outputs, for example, a voice message such as "a place to which the commodity is returned is different". Therefore, it is possible to easily identify a mistake of returning a commodity to a section of another commodity having the same unit weight.

Next, when there are the consumer SA and the consumer SB as consumers who can perform the return behavior, it can be assumed that the consumer SB performs the return behavior of returning the commodity B to the section 202. When the consumer SA is closer to the section 202 than the consumer SB, in the integrated processing unit 67, the consumer SA is first specified as the person returning the commodity in ACT 606 of the processing of the plurality of persons. But since the consumer SA did not previously purchase any of commodity B, the integrated processing unit 67 determines YES in ACT 611 of the processing of the plurality of persons, also determines YES in ACT 613, and thus proceeds to ACT 614. In ACT 614, the consumer SB is specified as the person returning the commodity. As a result, since NO is determined in ACT 618, the return notification command is outputted to the sales management apparatus 7. Thus, the purchased commodity data for the commodity B is subtracted from the purchase list 712 of the consumer SB by the number of returned commodities.

Next, when there are the consumer SA, the consumer SB, and a consumer SC as consumers who can perform the return behavior, it can be assumed that the consumer SB performs the return behavior of returning the commodity B, which is only item purchased, to the section 202. Here, since the consumer SA is closest to the section 202, in the integrated processing unit 67, the consumer SA is first specified as the person returning the commodity in ACT 606 of the processing of the plurality of persons. But if the consumer SA does not previously purchase the commodity B, the integrated processing unit 67 determines YES in ACT 611 of the processing of the plurality of persons, determines No in ACT 613, and executes the processing of ACT 619 to ACT 621. As a result, the purchased commodity data in which the number of purchases of the commodity B is "−1"

is temporarily registered in the purchase list 711 of the consumer SA. In the purchase list 712 of the consumer SB, the purchased commodity data in which the number of purchases of the commodity B becomes "0" is temporarily registered. When it is assumed that the consumer SC previously purchased two commodities B, which is reflected in the purchase list 713 of the consumer SC, the purchased commodity data in which the number of purchases of the commodity B becomes "1" is temporarily registered.

After that, for example, if it is assumed that the consumer SA goes out of the tracking area 111 before the others, then a screen for determining whether the number of purchases of the commodity B is "−1" is displayed on the user terminal TM of the consumer SA. Here, since the actual number of purchases is "0", the consumer SA corrects the number of purchases to "0". In the settlement server 9, the settlement processing is executed based upon the data of the purchase list 711 in which the number of purchases is corrected.

If it is assumed that the consumer SB next goes out of the tracking area 111, a screen for determining whether the number of purchases of the commodity B is "0" is displayed on the user terminal TM of the consumer SB. Here, since the actual number of purchases is "0", the consumer SB does not correct the number of purchases. In the settlement server 9, the settlement processing is executed based upon the data of the purchase list 712. Thus, the number of purchases of the purchased commodity data of the commodity B stored in the purchase list 713 of the consumer SC is returned from "1" to "2". The temporary registration flag of the purchased commodity data becomes "0". Therefore, after that, when the consumer SC goes out of the tracking area 111, in the settlement server 9, the settlement processing is executed based upon the data of the purchase list 713.

As described above, according to the embodiment, it is possible to find inconsistency between a commodity actually purchased by a consumer and a commodity registered as a purchased commodity for the consumer before settlement.

A modification of the embodiment will be described.

The tracking processing unit 62 analyzes the image data fetched from the tracking sensors 21 and 22 and tracks the movement of the consumer staying in the tracking area 111. The tracking processing unit 62 may track the movement of the consumer based upon information from a receiver that receives a beacon transmitted from a transmitter carried by the consumer.

The personal authentication processing unit 63 may authenticate a consumer by biometric authentication. Here, the personal authentication devices 41 and 42 become devices that read biometric information such as a face, an iris, and a fingerprint.

The commodity monitoring processing unit 64 may monitor the movement of a commodity from an image photographed by a camera. Here, it is possible to detect that the commodity is returned to a wrong place based upon similarity between the image of the commodity photographed by the camera and an image of the commodity set in advance.

The commodity monitoring sensor 1 may detect an increase or a decrease in the number of commodities displayed. Here, when the data of the number thereof from the commodity monitoring sensor 1 decreases, the commodity monitoring processing unit 64 recognizes that the commodity is taken from a section in which the commodity monitoring sensor 1 is provided. When the data of the number thereof from the commodity monitoring sensor 1 increases, the commodity monitoring processing unit 64 recognizes that the commodity is placed in the section where the commodity monitoring sensor 1 is provided.

An image processing unit may be adopted instead of the voice synthesizing unit 66, and the notification may be performed by displaying an image. Alternatively, the notification may be performed by using a voice message and the image together.

The embodiment describes the case in which the integrated processing unit 67 executes the processing of the procedure illustrated in the flowchart of FIG. 19 in response to the exit notification command. Accordingly, when the integrated processing unit 67 receives the settlement notification command including the member ID from the POS terminal connected to the communication network, the integrated processing unit 67 may execute the processing after ACT 632 in FIG. 19.

The embodiment describes the shelf control apparatus 6 as a control device of the POS system. The control device is not limited to the shelf control apparatus 6 having the configuration illustrated in FIG. 3. For example, the control device may be configured by connecting a first computer apparatus including the tracking processing unit 62, the personal authentication processing unit 63, the commodity monitoring processing unit 64, and the behavior monitoring processing unit 65, and a second computer apparatus including the integrated processing unit 67 and the voice synthesizing unit 66 by using the communication network. Alternatively, the first computer apparatus may be further subdivided, or the voice synthesizing unit 66 may be excluded from the second computer apparatus.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A tracking-based point-of-sales (POS) system, comprising:

a product shelf associated with a product identified with a product ID, the product shelf including one or more product display levels, each having a product display region accessible from a customer in front of the product shelf;

a first sensing device configured to obtain location information of one or more customers around the product shelf, the first sensing device including a camera provided adjacent the product shelf at a first position higher than an upper end of the product shelf, directed to the customer area, and configured to capture images around the product shelf including the customer area;

a reader provided adjacent to the product shelf at a second position lower than the first position, directed to the customer area, and configured to read a customer ID from a medium carried by a customer, the reader comprising a display; and a processing device configured to:

perform location tracking with respect to the one or more customers who are in a first predetermined area set around the product shelf in the customer area based on the obtained location information, the location tracking with respect to each customer comprising repeatedly determining a location of the customer based on the images captured by the camera and a time when the location is determined and generating movement data of the customer based on the determined locations and times;

upon the reader reading the customer ID, a first operation to determine a number of potential authenticating customers who are in a second predetermined area set around the reader in the customer area based on a result of the location tracking, the second predetermined area having an overlap with the first predetermined area;

upon determining that the number of potential authentication customers is one, perform customer authentication using the customer ID read by the reader and associate the customer ID used for the customer authentication with the movement data of a customer identified with the customer ID; and upon determining that the number of potential authentication customers is two or more, cause the reader to generate an authentication fail notification on the display of the reader.

2. The tracking-based POS system according to claim 1, wherein the processing device does not perform the customer authentication upon determining that the number of potential authentication customers is two or more.

3. The tracking-based POS system according to claim 1, wherein the processing device is configured to:

assign a tracking ID to each of the one or more customers subjected to the location tracking; and associate the customer ID read by the reader with the tracking ID assigned to the one potential authentication customer, upon the customer authentication being successful.

4. The tracking-based POS system according to claim 3, wherein the processing device is configured to generate a purchase list upon association of the customer ID read by the reader with the tracking ID assigned to the one potential authentication customer.

5. The tracking-based POS system according to claim 4, wherein the processing device is configured to cause the reader to generate an authentication success notification, upon the customer authentication being successful.

6. The tracking-based POS system according to claim 1, wherein the reader is coupled to the product shelf.

7. The tracking-based POS system according to claim 1, wherein the reader faces in a direction different from a direction in which the product shelf faces.

8. The tracking-based POS system according to claim 1, further comprising:

a second sensing device configured to detect a product displacement activity and a product placement activity at the product shelf, the second sensing device including a weight scale provided on the product shelf and on which the product is placed, wherein the processing device is configured to:

upon the second sensing device detecting the product displacement activity, perform a second operation to determine a purchasing customer who has performed the product displacement activity based on a result of the location tracking, and perform a product registration to register the product of a first number to a purchase list of the purchasing customer;

upon the second sensing device detecting the product placement activity, perform a third operation to determine a product-returning customer who has performed the product placement activity based on a result of the location tracking, and perform a product deregistration to deregister the product of a second number from a purchase list of the product-returning customer; and upon the product deregistration causing less than zero of the product to be on the purchase list of the product-returning customer, perform an anomaly operation.

9. The tracking-based POS system according to claim 8, wherein the anomaly operation includes generating a signal to notify a product return at a wrong location.

10. The tracking-based POS system according to claim 9, wherein the signal is a voice message.

11. The tracking-based POS system according to claim 8, wherein the processing device is configured to, during the third operation:

determine a number of nearby customers who are in a third predetermined area set around the product shelf based on a result of the location tracking, the third predetermined area being included in the first predetermined area; and upon determining that the number of nearby customers is one, determine the nearby customer to be the product-returning customer.

12. The tracking-based POS system according to claim 11, wherein the processing device is configured to, during the third operation:

upon determining that the number of nearby customers is two or more, determine, among the nearby customers, a number of potential customers who are at locations where it is physically possible to perform the detected product placement activity based on a result of the location tracking and a position of the product placement activity; and upon determining that the number of potential customers is one, determine the potential customer to be the product-returning customer.

13. The tracking-based POS system according to claim 12, wherein the processing device is configured to, during the second operation:

upon determining that the number of potential customers is two or more, determine a selected one of the potential customers to be the product-returning customer.

14. The tracking-based POS system according to claim 13, wherein when the product deregistration causes the number of the product on the purchase list of the selected one of the potential customers to be less than zero and the number of potential customers is two, the anomaly operation includes selecting the other one of the potential customers and performing the product deregistration with respect to a purchase list of the other one of the potential customers.

15. The tracking-based POS system according to claim 13, wherein when the product deregistration causes the number of the product on the purchase list of the selected one of the potential customers to be less than zero and the number of potential customers is three or more, the anomaly operation includes performing a temporary product deregistration with respect to a purchase list of all of the potential customers other than the selected one of the potential customers.

16. The tracking-based POS system according to claim 15, wherein the processing device is further configured to receive a confirmation of the temporary product deregistration from one of the other potential customers other than the selected one of the potential customers, and upon receiving the confirmation, invalidate the temporary product deregistration for the potential customers other than the selected one of the potential customers and the one with the confirmation.

17. The tracking-based POS system according to claim 15, wherein the processing device is further configured to receive a disconfirmation of the temporary product deregistration from one of the other potential customers other than the selected one of the potential customers, and upon receiving the disconfirmation, modify the purchase list of the one of the other potential customers.

18. The tracking-based POS system according to claim 8, wherein the second sensing device includes a camera configured to capture images of the product shelf, and the second sensing device detects the product displacement activity based on a hand movement to and then from the product shelf in the captured images and a decrease of a weight detected by the weight scale, and detects the product placement activity based on a hand movement to and then from the product shelf in the captured images and an increase of the weight detected by the weight scale.

19. The tracking-based POS system according to claim 18, wherein the processing device is further configured to determine the first number based on an amount of the decrease and the second number based on an amount of the increase.

20. The tracking-based POS system according to claim 1, wherein the product shelf includes a plurality of product display levels, and one of the plurality of product display levels overlaps with the second position.

* * * * *